US009596261B1

(12) United States Patent
Lukacs et al.

(10) Patent No.: US 9,596,261 B1
(45) Date of Patent: *Mar. 14, 2017

(54) SYSTEMS AND METHODS FOR DELIVERING CONTEXT-SPECIFIC INTROSPECTION NOTIFICATIONS

(71) Applicant: Bitdefender IPR Management Ltd., Nicosia (CY)

(72) Inventors: Sandor Lukacs, Floresti (RO); Andrei V. Lutas, Satu Mare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,917

(22) Filed: Mar. 23, 2015

(51) Int. Cl.
  *H04L 29/06* (2006.01)
  *G06F 9/455* (2006.01)

(52) U.S. Cl.
  CPC ........ *H04L 63/145* (2013.01); *G06F 9/45558* (2013.01); *G06F 2009/45587* (2013.01)

(58) Field of Classification Search
  CPC ...... G06F 21/566; G06F 21/554; G06F 21/56; G06F 21/52; G06F 13/24; G06F 2009/45575; G06F 21/55; G06F 2009/45587; G06F 9/45558; H04L 63/14; H04L 63/1416; H04L 63/1433; H04L 63/1441; H04L 63/1466; H04L 63/145
  See application file for complete search history.

(56) References Cited

U.S. PATENT DOCUMENTS

| 5,826,084 | A | 10/1998 | Brooks et al. |
| 7,418,584 | B1 | 8/2008 | Klaiber et al. |
| 7,657,419 | B2 | 2/2010 | van der Made |
| 8,561,060 | B2 | 10/2013 | Serebrin et al. |
| 8,863,283 | B2 | 10/2014 | Sallam |
| 9,015,704 | B2 * | 4/2015 | Vandegrift ............. G06F 9/445 718/1 |
| 2004/0117532 | A1 | 6/2004 | Bennett et al. |
| 2005/0091652 | A1 | 4/2005 | Ross et al. |
| 2005/0251803 | A1 | 11/2005 | Turner et al. |

(Continued)

OTHER PUBLICATIONS

USPTO, Office Action mailed May 6, 2016 for U.S . Appl. No. 14/665,888, filed Mar. 23, 2015.

(Continued)

*Primary Examiner* — Catherine Thiaw
(74) *Attorney, Agent, or Firm* — Law Office of Andrei D Popovici, PC

(57) ABSTRACT

Described systems and methods enable a computer security module to protect a set of guest virtual machines against computer security threats. In some embodiments, the computer security module receives introspection notifications from the protected VM, each such notification indicating that a particular trigger event (e.g., a system call) has occurred during execution of guest software within the respective VM. In some embodiments, delivering a notification comprises suspending execution of guest software and switching the processor to executing a notification handler forming part of the computer security module. Some embodiments enable a context-specific delivery of notifications, wherein the set of events triggering notifications may vary from one guest process to another.

35 Claims, 12 Drawing Sheets

(56) References Cited

U.S. PATENT DOCUMENTS

| | | | |
|---|---|---|---|
| 2010/0031360 A1* | 2/2010 | Seshadri | G06F 21/57 726/24 |
| 2010/0107252 A1 | 4/2010 | Mertoguno | |
| 2011/0258610 A1* | 10/2011 | Aaraj | G06F 21/554 717/128 |
| 2011/0307955 A1 | 12/2011 | Kaplan et al. | |
| 2013/0340077 A1 | 12/2013 | Salsamendi et al. | |
| 2014/0053272 A1 | 2/2014 | Lukacs et al. | |
| 2014/0130158 A1 | 5/2014 | Wang et al. | |
| 2014/0189687 A1* | 7/2014 | Jung | G06F 9/45558 718/1 |
| 2014/0215226 A1 | 7/2014 | Litty et al. | |
| 2015/0121135 A1* | 4/2015 | Pape | G06F 11/1484 714/15 |
| 2015/0186643 A1* | 7/2015 | Tu | G06F 21/53 726/23 |
| 2015/0379279 A1 | 12/2015 | Feroz et al. | |

OTHER PUBLICATIONS

World of Computing "Instructions in Microprocessor", 4 pages, http://www.worldofcomputing.net/processor/instructions-in-microprocessor.html, date listed on PTO-892 as Apr. 7, 2013.

Whatis "no op (no operation)", retrieved from http://whatis.techtarget.com/definition/no-op-no-operation, date listed on PTO-892 as Mar. 24, 2011.

USPTO, Office Action mailed May 4, 2016 for U.S. Appl. No. 14/665,856, filed Mar. 23, 2015.

McDowell et al., "Pacifica—Next Generation Architecture for Efficient Virtual Machines," Presentation at WinHEC 2005, Advanced Micro Devices, p. 1-29, Sunnyvale, CA, Apr. 2005.

Faydoc, "CMPXCHG8B—Compare and Exchange 8 Bytes," Intel Pentium Instruction Set Reference, p. 1, archive.org indicates the webpage was available on Nov. 15, 2006.

Beck et al., "Syscall Interception in Xen Hypervisor," HAL, p. 1-23, Inria, Rocquencourt, France, Nov. 10, 2009.

AMD, "AMD64 Architecture Programmer's Manual vol. 2: System Programming," AMD64 Technology, Advanced Micro Devices, p. 1-86, Sunnyvale, CA, May 2013.

Jurczyk, Mateusz, "Windows X86 System Call Table (NT/2000/XP/2003/Vista/2008/7/8)," p. 1-7, Team Vexillium, Poland, archive.org indicates the webpage was available on Dec. 1, 2013.

Jeschke, Rene, "LDS/LES/LFD/LGS/LSS: Load Far Pointer," x86 Instruction Set Reference, p. 1, archive.org indicates the webpage was available on Jul. 27, 2014.

Intel, "Intel Architecture Instruction Set Extensions Programing Reference," Intel Corporation, p. 1-30, Santa Clara, CA, Oct. 2014.

Intel, "VMCALL," Intel Corporation, Intel 64 and IA-32 Architectures Software Developer's Manual, Combined vols. 1, 2A, 2B, 2C, 3A, 3B, and 3C, p. 3032-3033, Santa Clara, CA, Jan. 2015.

Lukacs, U.S. Appl. No. 14/665,856, filed Mar. 23, 2015.

Lukacs, U.S. Appl. No. 14/665,888, filed Mar. 23, 2015.

USPTO, Notice of Allowance mailed Nov. 14, 2016 for U.S. Appl. No. 14/665,888, filed Mar. 23, 2015.

USPTO, Notice of Allowance mailed Nov. 4, 2016 for U.S. Appl. No. 14/665,856, filed Mar. 23, 2015.

* cited by examiner

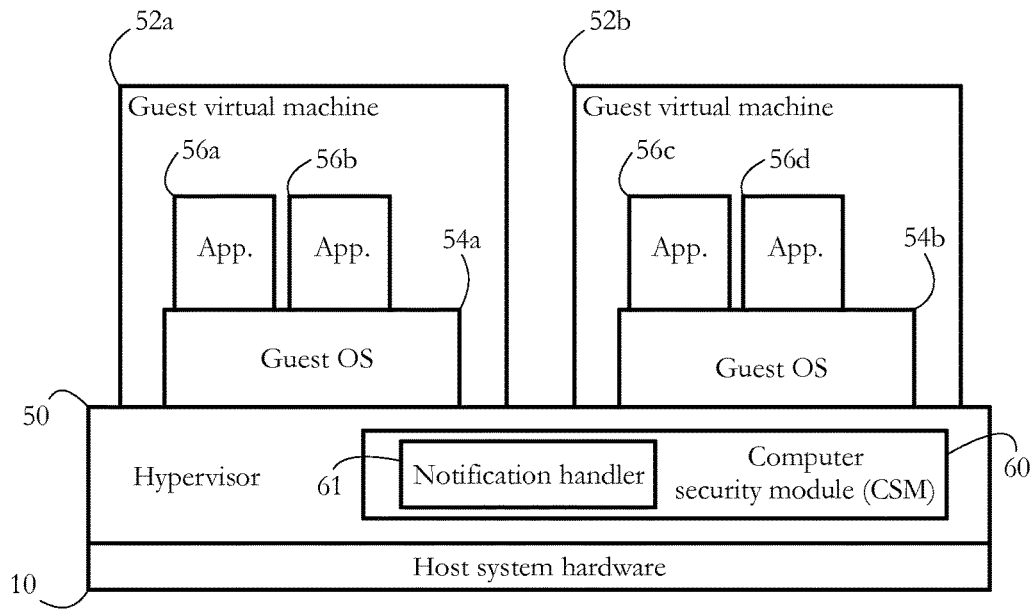
FIG. 2-A
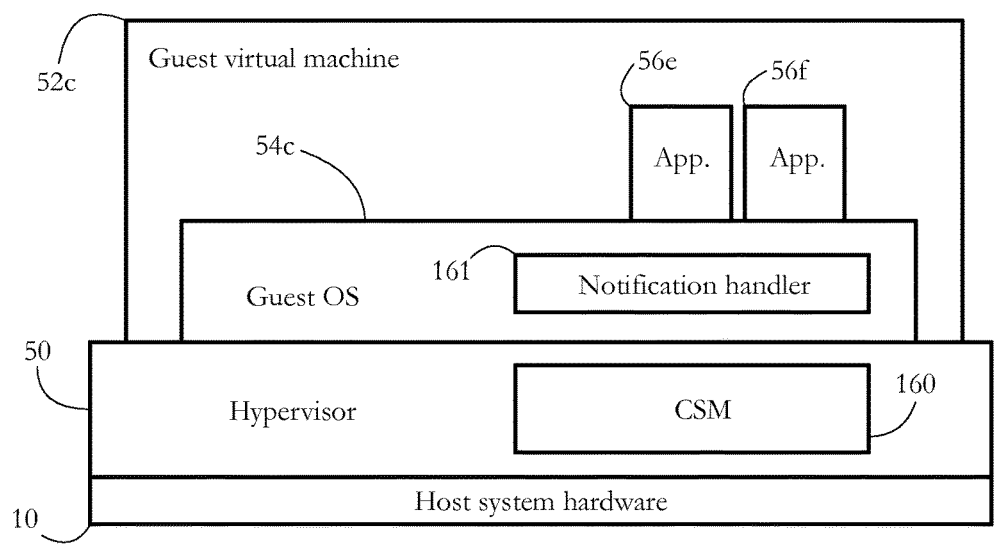
FIG. 2-B

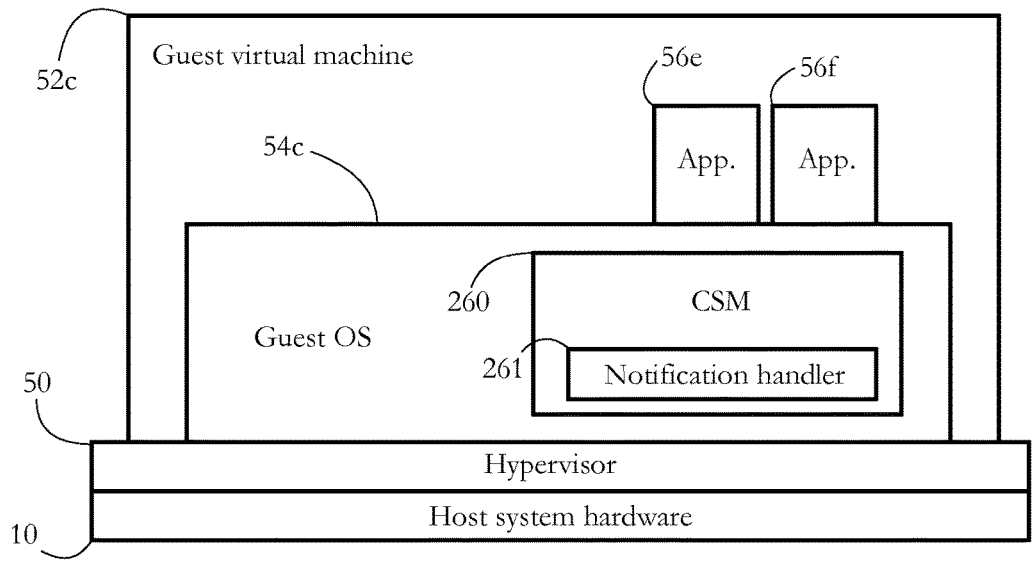
FIG. 2-C
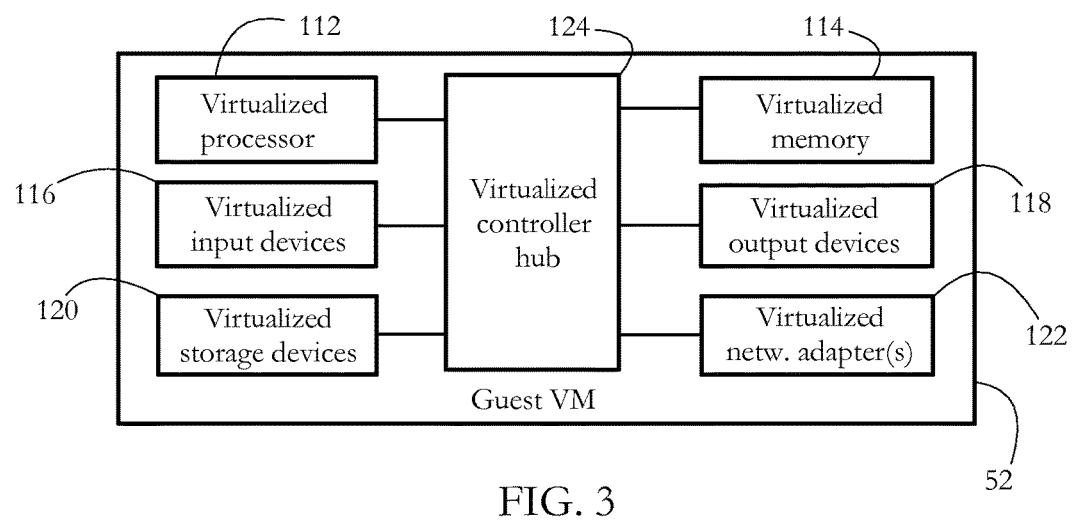
FIG. 3

SYSTEMS AND METHODS FOR DELIVERING CONTEXT-SPECIFIC INTROSPECTION NOTIFICATIONS

BACKGROUND

The invention relates to computer security systems and methods, and in particular, to systems and methods for protecting hardware virtualization environments from computer security threats.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others. Computer security software may be used to protect computer systems from malicious software.

Conventional security software may detect the occurrence of certain events (e.g., system calls, the execution of certain instructions, attempts to access certain resources) during execution of the operating system and/or of various applications on the respective computer system, and determine whether such events are caused by malicious software. Intercepting such events may require intrusive actions, such as modifying certain functions of the operating system (a technique commonly known as hooking) Hooking may be detected and disabled by malicious software, and may create performance and stability problems for the respective computer system.

Hardware virtualization technology allows the creation of simulated computer environments commonly known as virtual machines (VM), which behave in many ways as physical computer systems. In many applications, such as server consolidation and infrastructure-as-a-service, several virtual machines may run simultaneously on the same computer system, sharing hardware resources among them, thus reducing investment and operating costs. Each virtual machine may run its own operating system and/or software applications separately from other virtual machines, and may thus require protection from computer security threats.

The operation of computer security software is typically more complex and computationally expensive when carried out in hardware virtualization environments, compared to non-virtualized environments. In some configurations, security software executes outside the protected virtual machine, thus being inaccessible to malicious software infecting the respective VM. In such cases, the occurrence of various events within the protected VM may need to be detected from outside the respective VM. In conventional hardware virtualization security applications, such detection is typically achieved via hooking In one such example, the protected VM is configured to suspend execution when a certain event occurs, and to transfer control of the processor to computer security software executing outside the respective VM. After analyzing the event, security software may instruct the processor to resume execution of the respective VM. Such VM suspend/resume cycles may carry a substantial computational expense.

There is a substantial interest in improving the efficiency of computer security operations in hardware virtualization platforms.

SUMMARY

According to one aspect, a host system comprises a hardware processor and a memory, the hardware processor having a first register and a second register, wherein the hardware processor is configured to perform memory address translations according to a content of the first register and to deliver introspection notifications according to a content of the second register. The hardware processor is further configured, in response to receiving from the memory a register update instruction instructing the hardware processor to write a first value to the first register, to write the first value to the first register, and to write a second value to the second register, wherein the writing of the first value and the writing of the second value are performed together as an atomic operation. The hardware processor is further configured to receive from the memory an introspection notification instruction instructing the processor to deliver an introspection notification, the introspection notification instruction forming part of a guest process executing within a virtual machine exposed on the host system, wherein execution of the guest process would cause an occurrence of a trigger event within the virtual machine. The hardware processor is further configured, in response to receiving the introspection notification instruction, to determine according to a content of the second register whether a delivery condition is satisfied. The hardware processor is further configured, in response to determining whether the delivery condition is satisfied, when the delivery condition is satisfied, to deliver the introspection notification, and when the delivery condition is not satisfied, to continue execution of the guest process without delivering the introspection notification. Delivering the introspection notification comprises suspending execution of the guest process and in response, switching to executing a computer security program distinct from the guest process, the computer security program configured to determine whether the occurrence of the trigger event is indicative of a computer security threat.

According to another aspect, a non-transitory computer-readable medium stores instructions which, when executed by a hardware processor of a host system causes the host system to form a computer security program. The computer security program is configured to determine whether an occurrence of a trigger event within a virtual machine exposed on the host system is indicative of a computer security threat. The hardware processor comprises a first register and a second register, wherein the hardware processor is configured to perform memory address translations according to a content of the first register and to deliver introspection notifications according to a content of the second register. The hardware processor is further configured, in response to receiving from a memory of the host system a register update instruction instructing the hardware processor to write a first value to the first register, to write the first value to the first register, and to write a second value to the second register, wherein the writing of the first value and the writing of the second value are performed together as an atomic operation. The hardware processor is further configured to receive from the memory an introspection notification instruction instructing the processor to deliver an introspection notification, the introspection notification instruction forming part of a guest process executing within a virtual machine exposed on the host system, wherein execution of the guest process would cause the occurrence of the trigger event. The hardware processor is further configured, in response to receiving the introspection notification instruction, to determine according to a content of the second register whether a delivery condition is satisfied. The hardware processor is further configured, in response to determining whether the delivery condition is satisfied, when the delivery condition is satisfied, to deliver the introspection notification, and when the delivery condition is not satisfied, to continue execution of the guest process without delivering the introspection notification. Delivering the introspection notification comprises suspending execution of the guest process and in response, switching to executing a computer security program distinct from the guest process.

According to another aspect, a method protects a host system from computer security threats. The host system comprises a hardware processor and a memory, the hardware processor having a first register and a second register, wherein the hardware processor is configured to perform memory address translations according to a content of the first register and to deliver introspection notifications according to a content of the second register. The hardware processor is further configured to execute a guest process within a virtual machine exposed on the host system, wherein execution of the guest process would cause an occurrence of a trigger event within the virtual machine. The hardware processor is further configured, in response to receiving from the memory a register update instruction instructing the hardware processor to write a first value to the first register, to write the first value to the first register, and to write a second value to the second register, wherein the writing of the first value and the writing of the second value are performed together as an atomic operation. The method comprises employing the hardware processor to receive from the memory an introspection notification instruction instructing the hardware processor to deliver an introspection notification, the introspection notification instruction forming part of the guest process. The method further comprises, in response to receiving the introspection notification instruction, employing the hardware processor to determine according to a content of the second register whether a delivery condition is satisfied. The method further comprises, in response to determining whether the delivery condition is satisfied, when the delivery condition is satisfied, employing the hardware processor to deliver the introspection notification, and when the delivery condition is not satisfied, employing the hardware processor to continue execution of the guest process without delivering the introspection notification. Delivering the introspection notification comprises employing the hardware processor to suspend execution of the guest process and in response, to switch to executing a computer security program distinct from the guest process, the computer security program configured to determine whether the occurrence of the trigger event is indicative of a computer security threat.

BRIEF DESCRIPTION OF THE DRAWINGS

The foregoing aspects and advantages of the present invention will become better understood upon reading the following detailed description and upon reference to the drawings where:

FIG. 2-A shows an exemplary set of virtual machines (VMs) exposed by a hypervisor executing on the host system, and a computer security module executing at the level of the hypervisor and protecting the set of virtual machines against computer security threats according to some embodiments of the present invention.

FIG. 2-B shows an alternative configuration, wherein a computer security module executes outside the protected VM, whereas a notification handler executes within the protected VM, according to some embodiments of the present invention.

FIG. 2-C shows another configurations, wherein both the computer security module and notification handler execute within the protected VM, according to some embodiments of the present invention.

FIG. 3 shows an exemplary configuration of virtualized hardware exposed as a guest virtual machine according to some embodiments of the present invention.

DETAILED DESCRIPTION OF PREFERRED EMBODIMENTS

Figure 1:
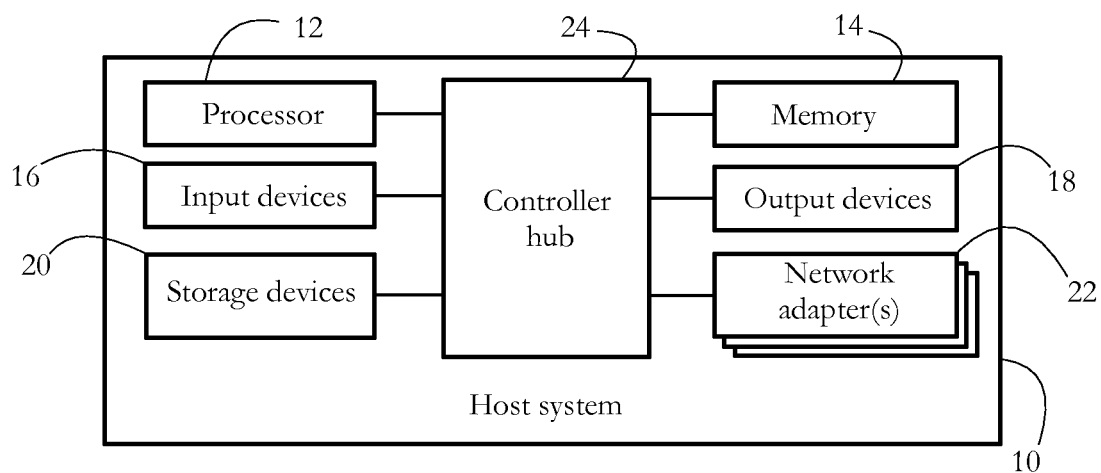
FIG. 1 shows an exemplary hardware configuration of a host computer system protected against computer security threats according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, unintended or unauthorized modification of data and/or hardware, and destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a guest process is a process executing within a virtual machine. Unless otherwise specified, a page represents the smallest unit of virtual memory that can be individually mapped to a physical memory of a host system. The term "logic" encompasses hardware circuitry having a fixed or a reconfigurable functionality (e.g., field-programmable gate array circuits), but does not encompass software emulating such functionality on a general-purpose computer. Unless otherwise specified, a register represents a storage component integrated on a common semiconductor substrate with, or forming part of a processor, and distinct from random-access memory (RAM). Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

FIG. 1 shows an exemplary hardware configuration of a host system 10 protected from computer security threats according to some embodiments of the present invention. Host system 10 may represent a corporate computing device such as an enterprise server, or an end-user device such as a personal computer, tablet computer, or smartphone. Other exemplary host systems include TVs, game consoles, wearable computing devices, or any other electronic device having a memory and a processor. Host system 10 may be used to execute a set of software applications. In some embodiments, host system 10 is configured to support hardware virtualization and to expose a set of virtual machines, as shown below.

FIG. 1 illustrates a computer system; the hardware configuration of other host systems, such as smartphones and tablet computers, may differ. System 10 comprises a set of physical devices, including a processor 12, a memory unit 14, a set of input devices 16, a set of output devices 18, a set of storage devices 20, and a set of network adapters 22, all connected by a controller hub 24. In some embodiments, processor 12 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 12 in the form of a sequence of processor instructions (e.g. machine code or other type of software). Memory unit 14 may comprise volatile computer-readable media (e.g. DRAM, SRAM) storing data/signals accessed or generated by processor 12 in the course of carrying out instructions.

Input devices 16 may include computer keyboards, mice, and microphones, among others, including the respective hardware interfaces and/or adapters allowing a user to introduce data and/or instructions into host system 10. Output devices 18 may include display devices such as monitors and speakers, among others, as well as hardware interfaces/adapters such as graphic cards, allowing host system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 24 may include a memory management unit (MMU), an input/output (I/O) controller, and an interrupt controller, among others. In another example, controller hub 24 may comprise a northbridge connecting processor 12 to memory 14 and/or a southbridge connecting processor 12 to devices 16, 18, 20, and 22. In some embodiments, controller hub 24 may be integrated, in part or entirely, with processor 12, e.g., the MMU may share a common semiconductor substrate with processor 12.

FIG. 2-A shows an exemplary software configuration according to some embodiments of the present invention, wherein host system 10 uses hardware virtualization technology to operate a set of guest virtual machines 52a-b exposed by a hypervisor 50. Using a hypervisor to manage multiple virtual machines is common in applications such as cloud computing and server consolidation, among others. A virtual machine (VM) is known in the art as an abstraction, e.g., a software emulation, of an actual physical machine/computer system, the VM capable of running an operating system and other applications. In some embodiments, hypervisor 50 includes software configured to create or enable a plurality of virtualized devices, such as a virtual processor and a virtual MMU, and to present such virtualized devices to software in place of the real, physical devices of host system 10. Such operations of hypervisor 50 are commonly known in the art as exposing a virtual machine. In some embodiments, hypervisor 50 allows a multiplexing (sharing) by multiple virtual machines of hardware resources of host system 10. Hypervisor 50 may further manage such multiplexing so that each guest VM 52a-b operates independently and is unaware of other VMs executing concurrently executing on host system 10. Examples of popular hypervisors include the VMware vSphere™ from VMware Inc. and the open-source Xen hypervisor, among others.

FIG. 3 shows an exemplary configuration of a virtual machine 52, as exposed by hypervisor 50. VM 52 may represent, for instance, any of VMs 52a-b of FIG. 2-A. VM 52 includes a virtualized processor 112, a virtualized memory unit 114, virtualized input devices 116, virtualized output devices 118, virtualized storage 120, virtualized network adapters 122, and a virtualized controller hub 124. Virtualized processor 112 comprises an emulation of at least some of the functionality of processor 12, and is configured to receive for execution processor instructions forming part of software such as an operating system and other applications. Software using virtual processor 112 for execution is said to execute within virtual machine 52. In some embodiments, virtualized memory unit 114 comprises addressable spaces for storing and retrieving data used by virtualized processor 112. Other virtualized devices (e.g., virtualized input, output, storage, etc.) emulate at least some of the functionality of the respective physical devices of host system 10. Virtualized processor 112 may be configured to interact with such devices as it would with the corresponding physical devices. For instance, software executing within VM 52 may send and/or receive network traffic via virtualized network adapter(s) 122. In some embodiments, hypervisor 50 may expose only a subset of virtualized devices to VM 52 (for instance, only virtualized processor 112, virtualized memory 114, and parts of hub 124). Hypervisor 50 may also give a selected VM direct and exclusive use of some hardware devices of host system 10. In one such example, VM 52a (FIG. 2) may have exclusive use of input devices 16 and output devices 18, but lack a virtualized network adapter. Meanwhile, VM 52b may have direct and exclusive use of network adapter(s) 22. Such configurations may be implemented, for instance, using VT-d® technology from Intel®.

Each VM 52a-b in FIG. 2-A may execute a guest operating system (OS) 54a-b, respectively. A set of exemplary applications 56a-d generically represent any software application, such as word processing, image processing, media player, database, calendar, personal contact management, browser, gaming, voice communication, data communication, and computer security applications, among others. Operating systems 54a-b may comprise any widely available operating system such as Microsoft Windows®, MacOS®, Linux®, iOS®, or Android®, among others. Each OS 54a-b provides an interface between applications executing within the respective VM and the virtualized hardware devices of the respective VM. In the following description, software executing on a virtual processor of a virtual machine is said to execute within the respective virtual machine. For instance, in the example of FIG. 2-A, applications 56a-b are said to execute within guest VM 52a, while applications 56c-d are said to execute within guest VM 52b. In contrast, hypervisor 50 is said to execute outside, or below, guest VMs 52a-b.

In some embodiments, a computer security module (CSM) 60 executes outside guest VMs 52a-b, and is configured to protect VMs 52a-b from computer security threats, such as malicious software and/or spyware. CSM 60 may be incorporated into hypervisor 50 (for instance as a library), or may be delivered as a computer program distinct and independent from hypervisor 50, but executing at the processor privilege level of hypervisor 50. CSM 60 may be a process (i.e., having a separate scheduled execution thread), or may operate as a collection of unscheduled code objects executing when triggered by certain notification events, as illustrated further below.

The term "introspection" is used herein to denote activities performed by CSM 60. In some embodiments, introspection comprises gathering information about software executing within a virtual machine. Examples of introspection include, among others, determining whether software executing within the respective VM performs certain actions, such as executing certain processor instructions, accessing certain hardware resources, using certain services of the OS, accessing certain memory locations, etc. Other examples of introspection comprise determining memory addresses used by various software objects executing within the respective VM, and/or controlling access to a memory location indicated by such addresses. In some embodiments, CSM 60 uses information obtained via introspection to determine whether certain software objects within the respective VM are malicious. When a malicious object is detected, CSM 60 may take protective action against the respective object, for instance to disable, quarantine, erase, or otherwise incapacitate the respective malicious object.

Some embodiments of the present invention describe systems and methods for delivering introspection notifications from software executing within a protected VM (e.g., applications 54a-d and/or OSs Ma-b) to CSM 60. In some embodiments, delivering an introspection notification (IN) from a target object comprises suspending execution of the respective target object and automatically switching processor 12 to executing a handler routine distinct from the target object. In FIG. 2-A, such a handler routine is illustrated as a notification handler 61 executing as part of CSM 60.

When notification handler 61 executes outside the VM that generates the introspection notification, as illustrated in FIG. 2-A, the respective notification comprises suspending execution of the respective VM. Such events are commonly termed VM exit events. One such example is the VMExit on Intel® platforms; similar mechanisms are enabled on other processors supporting hardware virtualization.

FIGS. 2-B-C show alternative embodiments of the present invention, wherein a notification handler 161, 261 executes within the virtual machine delivering the notification, at the level of a guest OS 54c. In such cases, delivering an introspection notification from a target object (e.g., applications 56e-f) comprises suspending execution of the target object and automatically switching processor 12 to executing handler 161 or 162. Some processor manufacturers include mechanisms for such switching. One such example is the virtualization exception (#VE) event on Intel® platforms. Another example comprises operating a Minivisor on AMD® platforms supporting virtualization. In a configuration as illustrated in FIG. 2-B, wherein a CSM 160 executes outside the respective VM, handler 161 may communicate with CSM 60 using any inter-process communication method known in the art of virtualization. For instance, handler 161 and CSM 160 may send data between them via a shared section of memory.

Some embodiments of the present invention introduce a dedicated processor instruction, herein termed introspection notification instruction, which, when executed from within a guest VM, instructs processor 12 to deliver an introspection notification. Instances of the introspection notification instruction may be inserted throughout guest software, such as OSs Ma-c and/or applications 56a-f in FIGS. 2-A-B-C. The introspection notification instruction may include a operation field (e.g., mnemonic, opcode) indicating an operation, and an operand field representing one or more operands. Some examples of introspection notification instruction are given below:

|  |  |
| --- | --- |
| NOTIFYINTRO | [1], |
| NOTIFYINTRO trigger_ID | [2], and |
| NOTIFYINTRO trigger_ID, trigger_PTR | [3], | wherein NOTIFYINTRO represents the operation and trigger_ID, trigger_PTR represent operands. The illustrated mnemonic, syntax, choice, and order of operands are meant as examples. A skilled artisan will appreciate that such details may be changed in many ways without affecting the scope of the present invention.

In some embodiments, an operand of the introspection notification instruction (e.g., trigger_ID in examples [2]-[3]) is indicative of a type or category of events occurring within the respective guest VM. In such embodiments, the current notification instruction is communicating the occurrence of an event of the respective type, herein termed trigger event. Exemplary types of trigger event include calls to certain OS functions (such as system calls). Other types of trigger event may include, among others, opening a file, creating a file, writing to a file, deleting a file, copying a file, creating a process, terminating a process, scheduling a thread for execution, suspending a thread because of a synchronization event (e.g. mutual exclusion), creating a heap, allocating memory from heap, extending the size of an execution stack, changing a memory access permission, performing a swap-in (e.g. disk-to-memory) operation, performing a swap-out (e.g. memory-to-disk) operation, loading an executable module (e.g., shared library—DLL), opening a registry key, renaming a registry key, detecting the attachment of a new hardware device, establishing a new network connection, receiving a network packet, raising the execution privileges of a thread, changing the discretionary access control (DAC) permission associated with a file, etc.

In some embodiments, the trigger event is identified by a numeric ID/label indicative of the respective type or category of trigger events. In one such example, NOTIFYINTRO 0x01a7 represents a notification about the occurrence within the respective guest of an event of type 0x01a7 (e.g., opening a disk file). The numeric ID/label associated to each trigger event type may be decided, for instance, by the OS manufacturer.

In some embodiments, another operand of the introspection notification instruction (e.g., trigger_PTR in example [3]) indicates a parameter associated with the current trigger event, such as a quantity being changed as a result of the occurrence of the respective trigger event. One such exemplary parameter is a pointer to an object or data structure modified by the occurrence of the trigger event. In one example wherein the trigger event comprises the OS switching from executing a first process to executing a second process, trigger_PTR may indicate a pointer to a data structure used by the OS to manage execution of the second process. In a Windows® environment, such a data structure may be the KPROCESS data structure associated with the second process. Passing such operands on to CSM 60 may facilitate introspection, by allowing CSM 60 to avoid calculating the respective values. Such calculations may be relatively expensive, requiring, for instance, memory address translations across multiple contexts.

Examples [2] and [3] illustrate introspection notification instructions having explicit operands. In some embodiments, operands of the introspection notification instruction may be implicit (e.g., as in [1]). In one such example, an operand may be stored in a pre-determined processor register of the respective guest (e.g., the EAX register on x86 platforms). In such embodiments, an exemplary sequence of instructions may be:

. . .
MOV EAX, 0x01a7
NOTIFYINTRO
. . . , wherein the MOV instruction puts the label associated with the type of event currently being notified into the EAX register of the respective guest VM, where it can be accessed by notification handler 61. The contents of the respective register may also be read by processor 12 in the process of event filtering, e.g., to determine whether introspection notifications are currently enabled for the respective type of trigger event (more details below).

In some embodiments, the notification instruction may be encoded in such a way, that it is ignored by certain processor models (e.g., legacy models). Such processors may thus interpret the notification instruction as a no-operation (NOP) instruction and skip over the respective notification instruction. Several methods are known in the art to achieve such encoding. One example uses a multiple-byte encoding of the NOP instruction (e.g., "NOP/0 Ev" on Intel® platforms). Another common method involves prefixing an existing instruction (such prefixes may not be interpreted or may be ignored by legacy processors). In yet another embodiment, the semantics of an existing instruction may be changed to achieve the new functionality. In one such example, an instruction which does not perform any useful operation on legacy processors, for instance, "MOV RDI, RDI" may function as an introspection notification instruction on a new generation of processors, especially if its encoding includes a segment prefix (e.g., ES).

Figure 4:
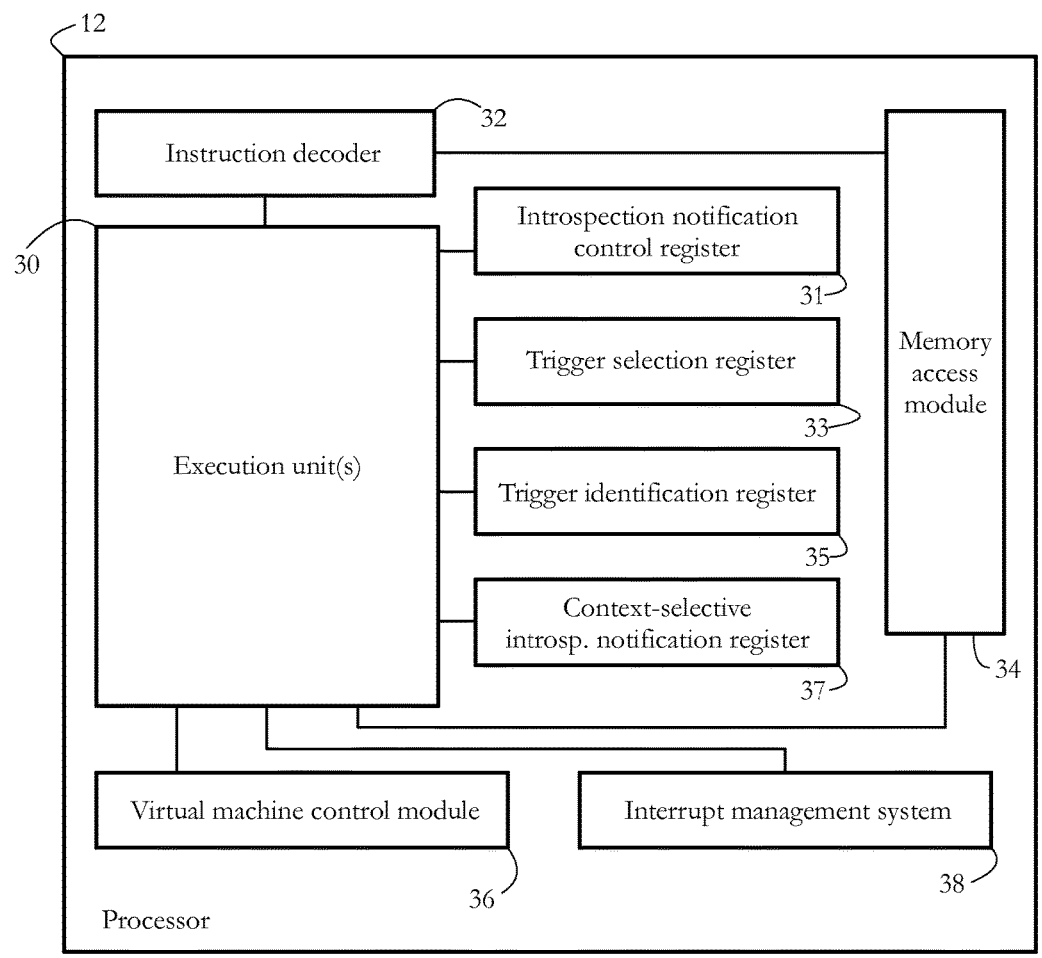
FIG. 4 shows exemplary components of a processor according to some embodiments of the present invention.

FIG. 4 shows exemplary hardware components of processor 12 according to some embodiments of the present invention. The illustrated components are meant as generic devices performing the described functionality; structural details may vary substantially among implementations. For instance, each illustrated component may comprise multiple interconnected subsystems, not necessarily in physical proximity to each other. The illustrated components are not exhaustive; processor 12 may include many other components (e.g., scheduler, register file, commit module, etc.), which were omitted from FIG. 4 for reasons of clarity.

Modern processors are typically configured for multithreading. In such configurations, physical processor 12 may operate a plurality of cores, each core further comprising multiple logical processors, wherein each logical processor may process an execution thread independently of, and concurrently with, other logical processors. Multiple logical processors may share some hardware resources, for instance, a common MMU. For simplicity, FIG. 4 illustrates a single logical processor. A skilled artisan will appreciate that the description may be extended to cover each logical processor of a multithreaded configuration.

Processor 12 may include logic/circuitry configured to carry out various stages of a processor pipeline. For instance, an instruction decoder 32 may perform instruction decoding operations, including translating each processor instruction into a set of micro-opcodes. A set of execution units 30 connected to decoder 32 may perform the execution stage of the pipeline. Exemplary execution units 30 include, among others, an arithmetic logic unit (ALU) and a floating-point unit (FPU). A memory access module 34 connected to decoder 32 and execution unit(s) 30 includes logic configured to interact with memory 14, e.g., to fetch instructions from memory, to read data from memory, and to write the result of execution of processor instructions to memory.

Processor 12 may further include a virtual machine control unit 36 configured to manage virtual machine state data. In some embodiments, a virtual machine state object (VMSO) comprises a data structure used internally by processor 12 to represent the current state of each virtualized logical processor exposed on host system 10. Exemplary VMSOs include the virtual machine control structure (VMCS) on Intel® platforms, and the virtual machine control block (VMCB) on AMD® platforms. VMSOs are typically set up by hypervisor 50. In some embodiments, processor 12 associates a region in memory with each VMSO, so that software may reference a specific VMSO using a memory address or pointer (e.g., the VMCS pointer on Intel® platforms).

Each VMSO may comprise, among others, a guest state area and a host state area, the guest state area holding the current CPU state (e.g., processor register values) of the respective guest VM, and the host state area storing the current CPU state corresponding to the execution of hypervisor 50. In some embodiments, each VMSO further comprises an indicator of a guest context. For instance, the guest state area of the VMSO may include an identifier of a process currently under execution by the respective virtualized processor/VM. One example of such an identifier is stored within the CR3 register of the respective virtual processor, and indicates an address of a page table configured address translations corresponding to the respective process.

In some embodiments, processor 12 may store a part of a VMSO within dedicated internal registers/caches, while other parts of the respective VMSO may reside in memory. At any given time, at most one VMSO (herein termed the current VMSO) may be loaded onto the processor, identifying the virtual processor/VM currently having control of processor 12. In a multithreading embodiment, a distinct VMSO may be loaded onto each distinct logical processor.

When processor 12 switches from executing the respective VM to executing hypervisor 50 (e.g., upon a VM exit), processor 12 may save the state of the respective VM to the guest state area of the current VMSO. When processor 12 switches from executing a first virtualized processor or a first VM to executing a second VM, the VMSO associated to the first VM is unloaded, and the VMSO associated to the second VM is loaded onto the processor, the second VMSO becoming the current VMSO. In some embodiments, such loading/unloading of VMSO data to/from processor 12 is performed by virtual machine control unit 36, e.g., as instructed by hypervisor 50. Unit 36 may further carry out the retrieval and/or saving of VMSO data from/to memory 14.

Processor 12 may further include an interrupt management system 38, generically representing logic configured to manage hardware interrupts and processor exceptions. System 38 may contain multiple subsystems distributed over several processor modules. For instance, system 38 may include a local advanced programmable interrupt controller (LAPIC). System 38 may generate and/or process a part of an introspection notification, such as a VM exit or virtualization exception, among others.

The illustrated processor further comprises a set of registers, configured to store control parameters regulating introspection notifications, as detailed below. Such parameters may regulate introspection notifications for the currently executing virtual processor (identified, e.g., by the currently loaded VMSO), or for a particular VM/virtual processor exposed on host system 10 (the targeted virtual processor may be specified, for instance, using a pointer to the respective VMSO, the pointer stored in one of the register fields). The illustrated registers may be dedicated control registers of processor 12, or a bank of model-specific registers (MSRs).

In some embodiments, parameters regulating introspection notifications are stored in a set of dedicated fields of a VMSO of the respective virtual machine, where they can be accessed for reading and/or writing by software executing, for instance, at the level of hypervisor 50. In such cases, VM control unit 36 may copy the respective parameter values into the illustrated registers (or into other internal processor registers) when loading the respective VMSO onto the processor, or may retrieve such values from memory on demand.

Figure 5:
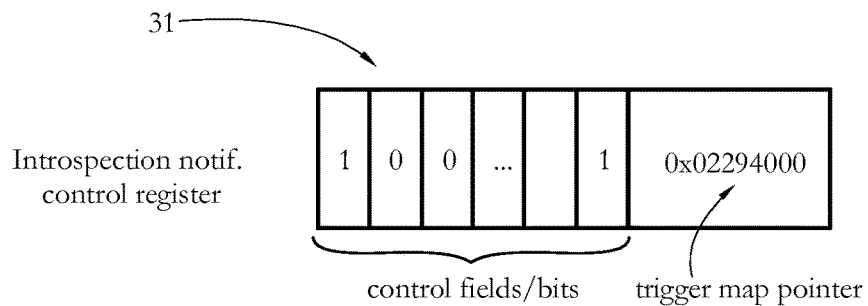
FIG. 5 shows an exemplary introspection notification control register of the processor according to some embodiments of the present invention.

FIG. 5 shows a set of exemplary fields of an introspection notification control register (INCR) 31, according to some embodiments of the present invention. In all drawings of processor registers shown herein, the provided illustration is meant as a generic example; the order and content of individual fields may vary from one implementation to another. Also, not all illustrated fields must be part of the same physical register; instead, some fields may reside in various locations within processor 12. In some embodiments, one of the control fields of INCR 31, herein named notification activation field, indicates whether introspection notifications are currently active. An exemplary notification activation field comprises a bit, which may take the values 1 (for ON) or 0 (for OFF). Some embodiments use a specific processor instruction to instruct processor 12 to deliver an introspection notification. In such embodiments, the current value(s) of the notification activation field, among others, are used by execution unit(s) 30 to determine whether or not to deliver the notification when encountering the respective processor instruction. When notifications are currently not active, as indicated by the current value(s) of the notification activation field, some embodiments may interpret the notification instruction as a no-operation (NOP) instruction.

In some embodiments, another control field (e.g., a bit) of INCR 31, herein named trigger filtering field, indicates whether trigger filtering is currently enabled. When the trigger filtering field is ON (e.g., 1), some embodiments of processor 12 may deliver introspection notification only for a selected subset of trigger events, as shown further below. Another control field (e.g., a bit) of INCR 31, herein termed exit control field, may indicate a type of exit event generated by processor 12 in the event of an introspection notification. In some embodiments, processor 12 may be configured to generate a VM exit (appropriate when the notification handler executes outside the respective guest VM, e.g., FIG. 2-A) or a virtualization exception (appropriate when the notification handler executes within the respective VM, e.g., FIGS. 2-B-C). In some embodiments, introspection notifications may be delivered to the kernel of the operating system (as opposed to handlers 61-161-261). Such a notification may be delivered, for instance, as an exception; this option may be activated by setting a corresponding value of the exit control register.

Figure 6:
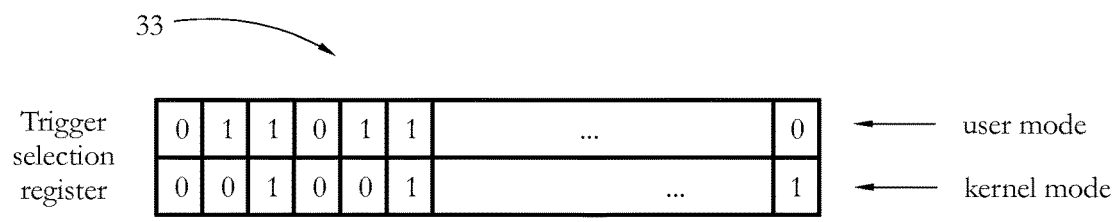
FIG. 6 shows an exemplary trigger selection register of the processor according to some embodiments of the present invention.
Figure 7:
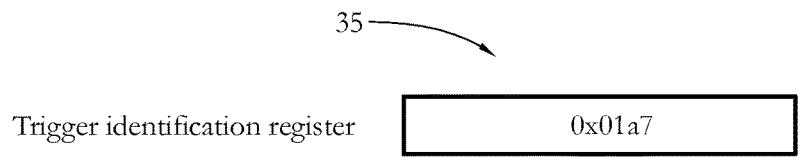
FIG. 7 shows an exemplary trigger identification register of the processor according to some embodiments of the present invention.

In some embodiments, processor 12 further comprises a trigger selection register 33, as illustrated in FIG. 6. Register 33 comprises a plurality of fields (e.g., a bitmap with N entries), wherein each field corresponds to a distinct type of trigger event. In one such example, one field may represent creating a new process, another field may represent accessing an OS registry, yet another field may represent opening a disk file for writing, etc. Such fields may be set independently of each other. In an exemplary embodiment, a chunk of register 33 (e.g., the first 1024 entries) may be reserved for trigger events of the system call type. Setting a field of trigger selection register 33 to ON (e.g., 1) may instruct the processor to generate an introspection notification indicating the occurrence of the type of trigger event associated to the respective field. In contrast, setting the respective field to OFF (e.g., 0) may instruct processor 12 to ignore the occurrence of the respective trigger event type (i.e., not to deliver introspection notifications of such events).

For each trigger event type, some embodiments further distinguish between several protection domains allowed by processor 12 (e.g., processor privilege levels, rings). In the example of FIG. 6, trigger selection register 33 comprises distinct bitmaps for user mode (ring 3) and kernel mode (ring 0). The values corresponding to the various protection domains may be set independently of each other. In such embodiments, the occurrence of a selected type of trigger event in user mode may generate an introspection notification, whereas the occurrence of the same type of trigger event in kernel mode may be ignored, for instance. The trigger selectivity enabled by register 33 allows for a useful customization of the notification mechanism. Ring-specific trigger customization may further refine the granularity of introspection notifications. Such features may be fully exploited by computer security software to optimize threat detection, as shown further below.

Some embodiments store the trigger selection bitmap(s) in memory, as opposed to in a dedicated processor register. In such embodiments, INCR 31 may further include a field configured to store a memory address of the respective data structure (such an address is herein termed trigger map pointer). Software such as CSM 60 or hypervisor 50 may thus selectively (de)activate individual trigger events by writing to the section of memory indicated by the trigger map pointer. In some embodiments, the trigger selection bitmap(s) occupy a dedicated field of a VMSO of the currently executing guest VM. In such cases, the trigger map pointer may coincide with a pointer to the respective VMSO (e.g. VMCS pointer on Intel® platforms).

In some embodiments, processor 12 further includes a trigger identification register 35 configured to store an identifying indicator of a current type of trigger event (e.g., a trigger ID). Contents of register 35 may be interpreted by processor 12, for instance, as implicit arguments of a NOTIFYINTRO instruction. Exemplary embodiments of trigger identification register 35 include the EAX register (on x86 platforms), and a dedicated MSR, among others. Guest software may instruct processor 12 to place a specific value into register 35 prior to issuing a notification instruction, the value indicating a selected trigger event type. An exemplary sequence of instructions is shown below:

. . .
   MOV reg35, 0x01a7
   NOTIFYINTRO
   . . . , wherein reg35 denotes the name of trigger identification register 35 (e.g. EAX), and 0x01a7 indicates the trigger ID.

When the trigger selection bitmap (e.g., register 35) is configured to store N distinct entries (e.g. N=8192), INCR 31 may further include a control field/bit herein termed overrun control field. The content of the overrun control field may indicate whether processor 12 should generate a particular event (e.g., exception) when the current value of trigger identification register 35 does not allow a positive identification of the current trigger event. Such a situation may arise, for instance, when register 35 stores a value greater than N, or when the current value of register 35 is otherwise outside the range of values assigned to trigger events. When the overrun control field is ON (e.g., 1), processor 12 may deliver the notification despite failing to identify the trigger event. Alternatively, processor 12 may generate another exception to alert the OS and/or hypervisor 50 about the error. Such a configuration may prevent a malicious exploitation of the introspection notification mechanism. In yet another embodiment, when the current value of register 35 is out of range, processor 12 may interpret the current instruction notification as a no-operation (NOP) instruction.

Modern operating systems typically manage a plurality of virtual memory spaces, each such virtual memory space comprising an abstraction of the actual physical memory 14, e.g., a contiguous space of virtual addresses. Each such memory space may be associated to a software object (e.g., a user process, a component of the OS, etc.) executing within the respective VM. To correctly map virtual addresses in the object's memory space to physical memory addresses, the OS may set up a translation data structure (e.g., page table), and save the respective data structure to memory. A pointer to the respective data structure typically resides in a dedicated processor register (e.g., the CR3 register on x86 platforms), and uniquely identifies the currently executing guest process. The memory space of a software object and its associated page table form what is commonly known in the art as the context of the respective software object.

Figure 8:
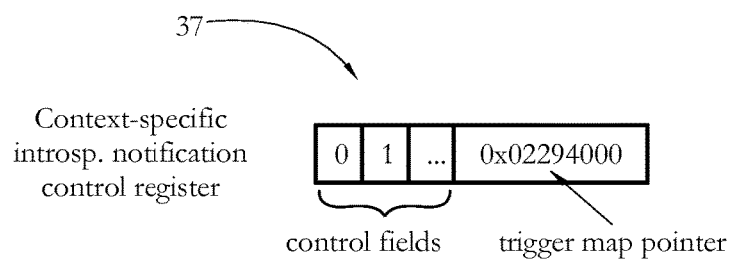
FIG. 8 shows an exemplary context-specific introspection notification register of the processor according to some embodiments of the present invention.

Some embodiments of the present invention enable context-specific introspection notifications, i.e., notification control parameters may vary independently between one context (e.g., guest process) and another. In such embodiments, processor 12 may comprise a context-specific INCR 37, as illustrated in FIG. 8. The structure of context-specific INCR 37 may be similar to that of global INCR 31 described above. Register 37 may replace register 31, or may be provided alongside register 31. Control parameters stored in register 31 are herein called "global" parameters, to distinguish them from context-specific control parameters stored in register 37. In an embodiment wherein context-specific INCR 37 coexists with "global" INCR 31, introspection notifications may be controlled by parameter values set in INCR 31 (as a default), unless context-specific parameter values are set in INCR 37. In an alternative embodiment, a control field/bit of context-specific INCR 37 indicates whether context-specific notifications are enabled or not. An ON value instructs processor 12 to use context-specific control values stored in INCR 37 instead of "global" values stored in INCR 31.

Context-specific INCR 37 may include an address field configured to store a pointer to a memory-located trigger selection bitmap set up for the respective context (e.g., trigger map pointer in FIG. 8). The trigger selection bitmap may indicate which types of trigger events may generate introspection notifications, when occurring during execution within the respective context—see above, in relation to FIG. 6. In some embodiments, the management of the trigger map pointer is similar to the management of page tables. The operating system typically creates a new context by allocating memory for the respective context's page table, and associating a pointer to the respective page table (e.g., page directory base register—PDBR pointer on Intel® platforms) with a data structure used by the OS to manage execution of the respective process. For instance, in Windows®, such a data structure may be the KPROCESS structure. When the OS switches contexts from a first process to a second process, a value of the PDBR pointer of the second process is read from the KPROCESS structure associated to the second process, and moved into the CR3 register. In some embodiments, as part of creating a new context, the OS may further allocate memory for a trigger selection bitmap to be used in the respective context, and may save the address of the trigger selection bitmap (e.g., a trigger map pointer) to the KPROCESS data structure associated to the respective process or to another context-specific data structure. Upon switching from a first context to a second context, the OS may retrieve the trigger map pointer associated to the second context from the respective context-specific data structure, and move it into context-specific INCR 37.

In some embodiments, context-specific INCR 37 is configured as an extension to the processor register indicating the current context (e.g., an extension of the CR3 register on x86 platforms). Register 37 may also be a register separate from CR3, e.g., a CR5 register or a dedicated MSR. However, in some embodiments, register 37 is operationally connected to CR3 in that an update of CR3 is atomically accompanied by an update of register 37, i.e., no interrupt can occur between updating CR3 and updating register 37. Such atomicity ensures consistency of context switching in a multithreaded environment. Some embodiments achieve a multi-register atomic update by using a dedicated processor instruction issued by the OS of the respective guest VM. One exemplary sequence of instructions is given below (the mnemonic, count, and order of operands may vary):

. . .
   MOV reg1, p2.PDBR
   MOV reg2, p2.TMP
   MOVDUALCR reg1 reg2
. . . , wherein p2.PDBR denotes the pointer to the PDBR of the second process, p2. TMP denotes the trigger map pointer associated to the second process, and wherein reg1 and reg2 denote some registers of processor 12, directly accessible to software (e.g., RCX and RDX on Intel® platforms). The illustrated instruction MOVDUALCR atomically moves the value of reg1 into CR3 and the value of reg2 into context-specific INCR 37 (e.g., CR5). The illustrated version of the instruction has CR3 and INCR 37 as implicit operands; in other embodiments the registers may be specified explicitly. Another embodiment may have reg1 and reg2 as implicit operands.

In an alternative embodiment, the atomic update of CR3 and context-specific INCR 37 may be achieved without a dedicated processor instruction. In one such example, processor 12 is configured to generate a VM exit event upon detecting an attempt to update the value of CR3. Such an update may indicate that the OS executing within the respective VM may request a context switch. The respective VM exit event may be trapped by a component of hypervisor 50, which may emulate the respective CR3 update and in response, also update the value of context-specific INCR 37, before resuming execution of the respective VM.

Figure 9:
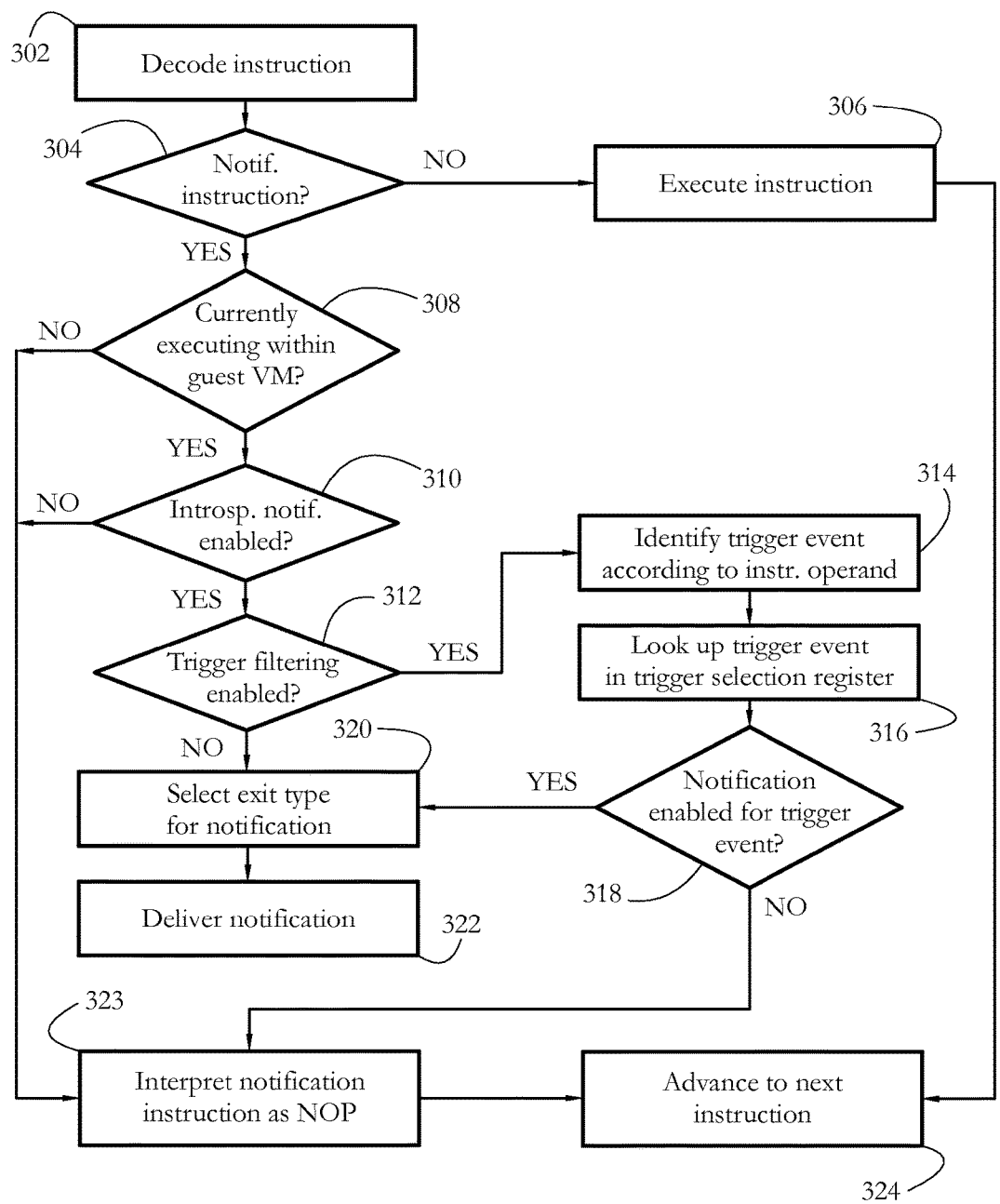
FIG. 9 shows an exemplary sequence of steps performed by the processor to execute an instruction according to some embodiments of the present invention.

FIG. 9 shows an exemplary sequence of steps performed by processor 12 to execute a current processor instruction according to some embodiments of the present invention. In response to decoding the instruction, a step 304 determines whether the current instruction is an introspection notification instruction (e.g., NOTIFYINTRO described above). When no, in a step 306, processor 12 may execute the current instruction and advance to the next processor instruction (step 324, then step 302). When the current instruction is an introspection notification instruction, a step 308 determines whether the current instruction is a guest instruction (i.e., executing within a guest VM). Step 308 may include determining whether processor 12 is currently executing in hardware virtualization mode. Such determinations may include checking a current value of a control flag of processor 12 (e.g., VMX flag on Intel® platforms). Step 308 may further include receiving from VM control module 36 an indicator of whether processor 12 currently executes in root mode (also known as ring −1 or VMXroot on Intel® platforms). Root mode is the ring with highest processor privileges, commonly associated with hypervisor 50. When hardware virtualization is not enabled, or when processor 12 is currently in root mode, some embodiments advance to the next processor instruction (step 324) without generating an introspection notification. In some embodiments, in such cases, the current instruction is interpreted as a no-operation instruction—NOP (step 323).

When the current instruction was issued by guest software (i.e., from within a guest VM), in a step 310, processor 12 may determine whether introspection notifications are currently active, for instance, according to a current value of the notification activation field of INCR 31 (see above, in relation to FIG. 5). When introspection notifications are currently disabled, processor 12 may proceed to step 323.

When introspection notifications are enabled, a step 312 determines whether trigger filtering is currently enabled, for instance, according to a current value of the trigger filtering field of INCR 31. When no, in a step 320 processor 12 selects a vehicle for the introspection notification, i.e., determines which type of exit event to generate in order to deliver the introspection notification. Such determinations may proceed, for instance, according to a current value of the exit control field of INCR 31, which may indicate whether to generate a VM exit, a virtualization exception (e.g., #VE), or another kind of processor event. A step 322 may then deliver the respective notification to a notification handler, such as handlers 61-161-261 in FIGS. 2-A-B-C, respectively. In some embodiments, delivering the introspection notification comprises suspending the execution of the current thread/guest process, and switching to executing the introspection handler.

When trigger filtering is enabled, in a step 314, processor 12 may identify the reason (type of trigger event) for the current notification, according to an operand of the current instruction. In some embodiments, the operand is implicit and is retrieved from trigger identification register 35 (e.g., the EAX register on x86 platforms). Once the trigger event type is identified, a sequence of steps 316-318 determines whether introspection notifications are currently enabled for the respective type of trigger event. Such determinations may include looking up a current value of a field of trigger selection register 33, the field corresponding to the respective type of trigger event (see e.g., FIG. 6 and associated description). In some embodiments, steps 316-318 may further include determining whether notifications are enabled for the current trigger event further according to the protection domain that processor 12 is currently executing in (e.g., some types of trigger events may generate introspection notifications only in user mode or kernel mode). When introspection notifications are enabled for the respective trigger event and protection ring, processor 12 may proceed to step 320 described above. When no, processor 12 may advance to the next instruction without generating a notification (for instance, processor 12 will interpret the current instruction as a NOP, step 323).

Figure 10:
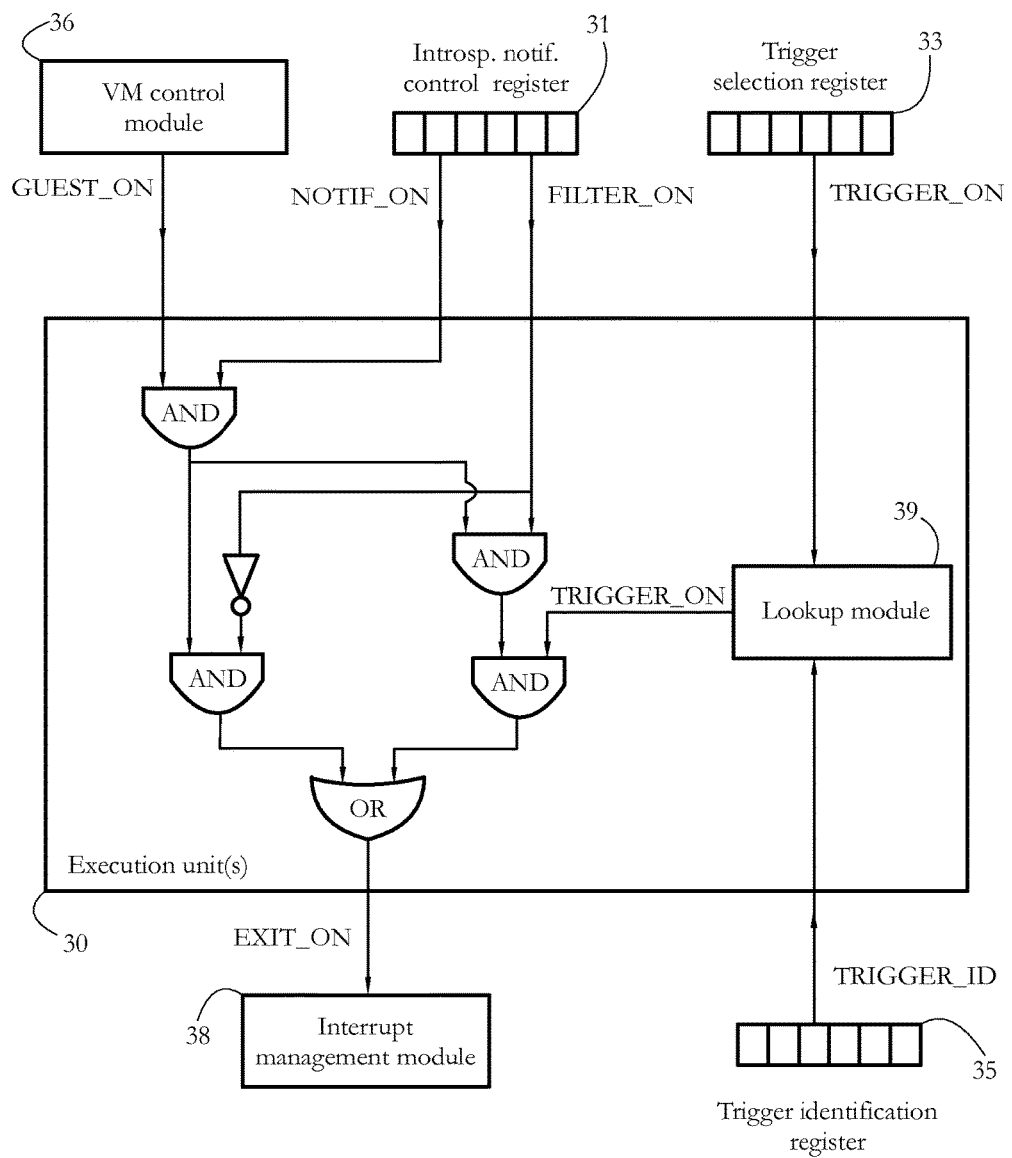
FIG. 10 shows an exemplary hardware configuration of an execution unit of the processor according to some embodiments of the present invention.

FIG. 10 shows an exemplary hardware configuration of execution unit 30 having the functionality described above in relation to FIG. 9. Various components of execution unit 30 that do not directly contribute to the described functionality have been left out for reasons of clarity. The logic illustrated in FIG. 10 receives an input denoted GUEST_ON from VM control module 36. GUEST_ON may be high (e.g., 1) when the current instruction executes within a guest VM. In some embodiments, the GUEST_ON signal is low when processor 12 is not executing in hardware virtualization mode (e.g., VMX not enabled on Intel® platforms), or when processor 12 currently executes in root mode (e.g., VMXroot on Intel® platforms). Execution unit 30 may further read a pair of values/signals NOTIF_ON and FILTER_ON from INCR 31 (or from context-specific INCR 37 when operating in context-specific notification configurations). NOTIF_ON may be high (e.g., 1) when the notification activation field of INCR 31 is ON indicating that introspection notifications are currently enabled, and low (e.g., 0) otherwise. FILTER_ON may be high/1 when the trigger filtering field of INCR 31 is ON indicating that trigger filtering in currently enabled, and low/0 otherwise.

Execution unit(s) 30 may further receive a value TRIGGER_ID from trigger identification register 35, the value uniquely identifying a type of trigger event that is the object of the current introspection notification. A lookup module 39 of unit 30 may perform a lookup operation to retrieve a value TRIGGER_ON indicating whether introspection notifications are currently enabled/active for the type of event indicated by TRIGGER_ID. An exemplary lookup operation may comprise retrieving the current value of a field of trigger selection register 35, the value located at a position indicated by TRIGGER_ID. In an embodiment wherein the trigger selection bitmap resides in memory, looking up TRIGGER_ON may include accessing memory at the location indicated by the trigger map pointer, plus an offset indicated by TRIGGER_ID. The logic illustrated in FIG. 10 produces a high output EXIT_ON only when the current instruction is a guest instruction and notifications are enabled. Further, EXIT_ON is high either when trigger filtering is off, or when trigger filtering is on and notifications are enabled for the respective trigger event.

Figure 11:
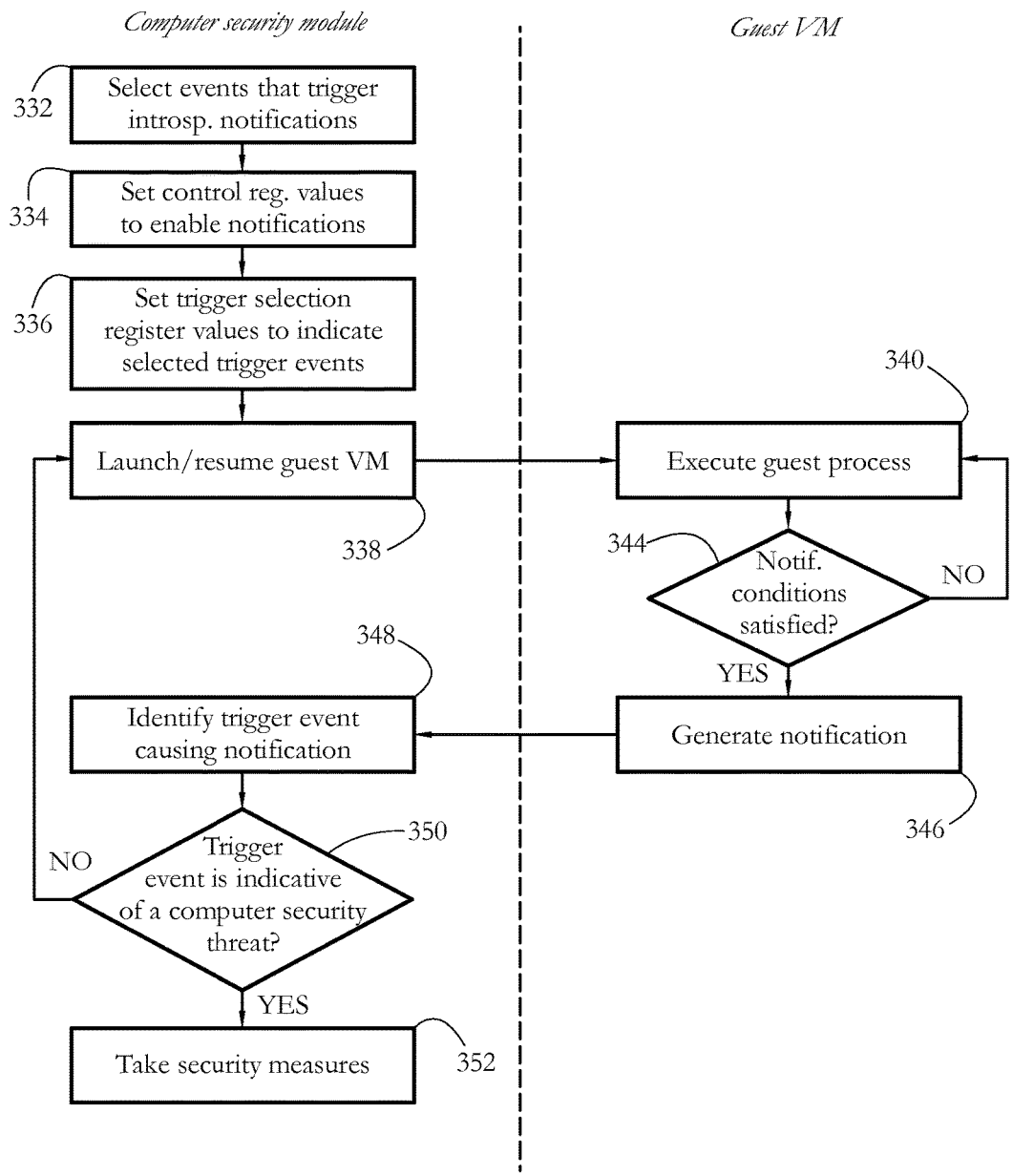
FIG. 11 shows an exemplary sequence of steps performed by a computer security program to protect a guest VM from computer security threats according to some embodiments of the present invention.

FIG. 11 shows an exemplary sequence of steps performed by computer security module 60 to protect a guest VM from computer security threats according to some embodiments of the present invention. In a step 332, CSM 60 may select a set of event types to monitor. The selection may be based on any method known in the art, for instance, according to established computer security heuristics. Such heuristics may rely on the observation that some types of events are more indicative of computer security threats than others, so notifying CSM 60 about those types of events may enable CSM 60 to effectively detect security threats.

In a sequence of steps 334-336, CSM 60 may configure the introspection notification mechanism by setting control parameters of INCR 31 such as the notification activation field and the trigger filtering field of INCR 31 to ON. CSM 60 may further set other fields of INCR 31 to indicate, among others, a choice of exit event type (VM exit, virtualization exception, etc.). CSM 60 may further configure the trigger selection bitmap(s) (e.g., fields of trigger selection register 33) to reflect the choice of trigger events made in step 332. Then, in a step 338, CSM 60 may instruct processor 12 to switch to executing the guest VM.

Having configured the introspection notification mechanism, CSM 60 may wait for a notification from within the monitored guest VM. Such a notification may arrive when appropriate conditions are met (see above, in relation to FIG. 9). As described above, the introspection notification may suspend execution of the monitored guest VM and switch processor 12 to executing a notification handler (e.g., handler 61 in FIG. 2-A). In a step 348, CSM 60 receives the notification via handler 61 and identifies the type of trigger event generating the current notification, for instance according to the current content of trigger identification register 35. In an embodiment wherein the notification handler executes outside the protected VM (e.g., FIG. 2-A), the current content of such registers may be read from a guest state area of the VMSO of the respective guest VM.

In a step 350, CSM 60 may determine whether the occurrence of the respective type of trigger event within the monitored guest VM is indicative of a security threat. Such determination may be made according to computer security heuristics, and may include corroborating the current event with other facts, e.g., a history of previous introspection notifications received from the same guest process and/or the same guest VM. When CSM 60 determines that the current trigger event is not indicative of a threat, CSM 60 may instruct processor 12 to resume execution of the monitored guest VM. When the current trigger event indicates a threat, in a step 352, CSM 60 may take security measures against the respective guest process/guest VM. Such measures may include blocking or quarantining the respective process, or otherwise preventing the respective process from executing. Security measures may further include alerting a system administrator and/or a user of the monitored guest VM.

Figure 12:
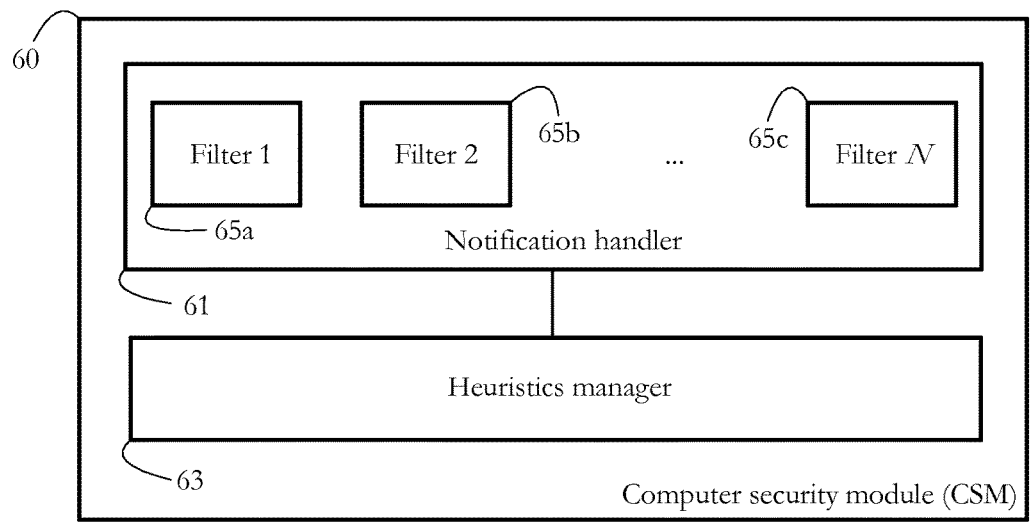
FIG. 12 illustrates exemplary components of the computer security module according to some embodiments of the present invention.

In some embodiments, CSM 60 may dynamically change control parameters of the introspection notification mechanism, to achieve an adaptive security monitoring of the guest VM. FIG. 12 shows exemplary components of a CSM 60 configured to perform adaptive, dynamic monitoring of a guest VM according to some embodiments of the present invention. CSM 60 comprises a heuristics manager 63 communicatively coupled to notification handler 61.

As described above in relation to FIGS. 2-A-B-C, some embodiments of the notification handler may execute outside of CSM 60 (possibly inside the monitored guest VM), but communicate the occurrence of an introspection notification to heuristics manager 63. The illustrated notification handler includes a plurality of distinct filters 65a-c, wherein each filter is configured to embody one or more threat detection heuristics. Each filter 65a-c may be an independent, unscheduled software object executing in response to receiving an introspection notification from within the monitored guest VM, and configured to signal to heuristics manager 63 when a certain detection condition regarding introspection notifications is satisfied. Some filters 65a-c may be configured to detect the occurrence of a certain type of trigger event (e.g., type A, B, or C), multiple occurrences of events of the same type (e.g., more then n occurrences of an event of type A), or an occurrence of a combination of events of various types (e.g., (A and (B or C))). Other exemplary filters 65a-c may signal to heuristics manager 63 when a particular sequence of trigger events (e.g. an event of type A followed by an event of type B followed by an event of type C, etc.) occurs within the monitored guest VM.

Figure 13:
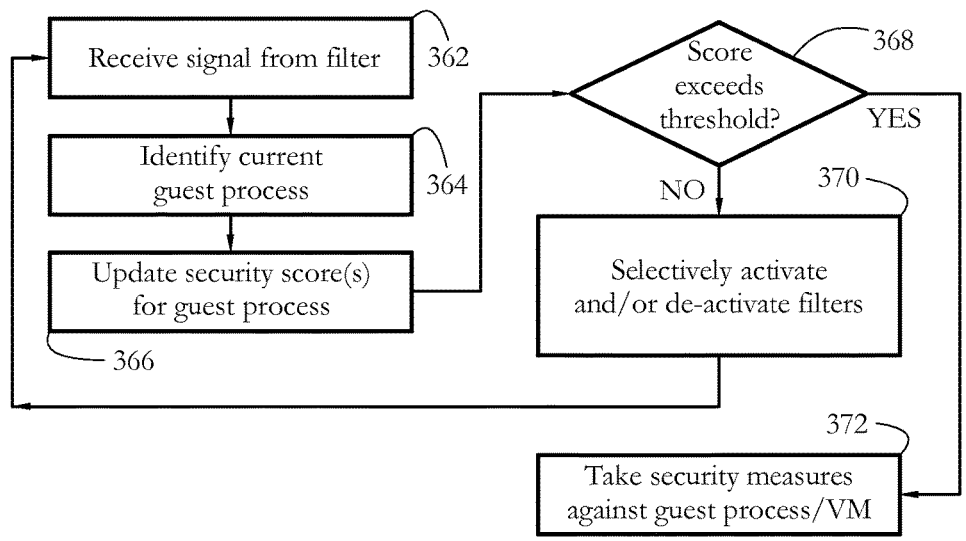
FIG. 13 shows an exemplary sequence of steps performed by the heuristics manager of the computer security module according to some embodiments of the present invention.

Heuristics manager 63 is configured to use the information received from filters 65a-c to determine whether the monitored guest VM is subject to a computer security threat (for instance, whether the monitored guest VM is running malicious software). FIG. 13 shows an exemplary sequence of steps performed by heuristics manager 63 according to some embodiments of the present invention. In a step 362, manager 63 may receive a signal from filter(s) 65*a-c* indicating that a certain type of trigger event (or a combination of trigger events) has occurred within the monitored guest VM. In a step 364, manager 63 may identify the guest process currently executing within the respective guest VM, for instance, according to a content of the guest state area of the VMSO of the respective guest VM/virtual processor (e.g. the content of the CR3 register). For each such guest process, CSM 60 may maintain one or more current security scores indicating, for instance, a likelihood that the respective process is malicious. In some embodiments, a global VM-wide score is used to assess the security of the entire guest VM. Using a global score may be beneficial for detecting sophisticated malicious attacks, wherein each of a set of processes carries out part of the attack, but none of the individual processes may be considered malicious in itself. In a step 366, heuristics manager 63 may update the security score(s) calculated for the respective guest process and/or VM, to reflect the new information received in step 362. Each such score may be compared to a pre-determined threshold. When the score(s) exceed(s) the respective threshold(s), in a step 368 heuristics manager 63 may determine that the respective guest process/guest VM is malicious and take security measures (step 372).

When the score(s) do(es) not indicate malice, in a step 370, heuristics manager 63 may selectively activate and/or de-activate some of filters 65*a-c* and return to step 362. Such activation and/or de-activation may be achieved, for instance, by changing the values of individual fields of the trigger selection bitmap, either in trigger selection register 33, or at the memory location indicated by the trigger map pointer of the monitored guest VM. Such changes effectively change the selection of events that trigger introspection notifications, while the monitoring is ongoing. Heuristics manager 63 may reduce the number of trigger events when the monitored VM is under no security threat, to reduce the overhead associated with introspection notifications. In contrast, the occurrence of certain trigger events, that may be particularly indicative of a security threat, may prompt heuristics manager 63 to expand surveillance of the monitored VM by expanding the set of events that trigger introspection notifications. Such a dynamic, run-time adjustment of monitoring can be done in a relatively fast and efficient manner, while ensuring consistency during multi-threading operations.

Some embodiments of CSM 60 perform context-specific security monitoring using the introspection notification mechanism described above. In some embodiments, context-specific monitoring comprises monitoring each guest process with a set of notification control parameters specific to the respective process. To achieve context-specific monitoring, CSM 60 (for instance by means of heuristics manager 63) may maintain a plurality of trigger event lists, each list associated to a guest context (e.g., a guest process) of the monitored guest VM, each list indicating a set of trigger events for monitoring the respective guest context/process. The elements of each such list may change during the lifetime of the respective guest context. Such dynamic, context-specific monitoring may be corroborated with a process reputation and/or whitelist database, wherein each guest process is rated according to its likelihood of being malicious. Processes known to be benign may then be monitored only with a lightweight set of selected trigger events, whereas unknown processes or processes that are suspected of malice may be monitored for using a large number of trigger events.

Figure 14:
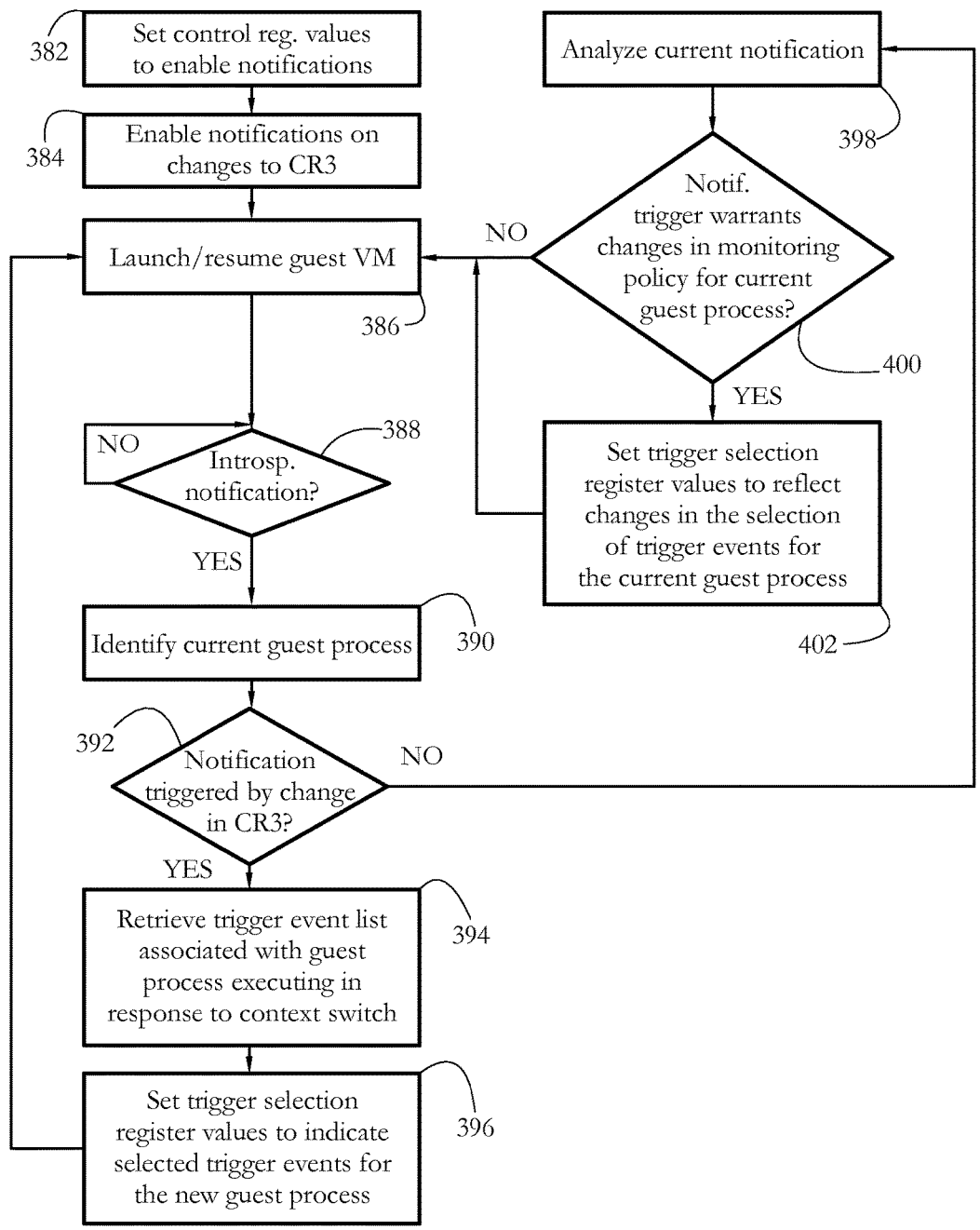
FIG. 14 illustrates an exemplary sequence of steps performed by the computer security module to carry out context-specific monitoring according to some embodiments of the present invention having a global introspection notification register.

FIG. 14 shows an exemplary sequence of steps performed by CSM 60 to carry out context-specific monitoring using global devices, such as INCR 31 and trigger selection register 33. In a step 382, CSM 60 may enable introspection notifications, for instance by setting the notification activation field of INCR 31 to ON. In a step 384, CSM 60 may configure processor 12 to generate a VM exit event in response to an attempt by the OS of the monitored guest VM to perform a context change. In some embodiments, step 384 includes enabling introspection notifications for a trigger event of the type "change in the value of the CR3 register", by setting the field corresponding to the respective event type to ON in register 33. Any other known method may be used to trigger a VM exit in response to a context change. Such methods include, among others, setting a configuration bit of a VMSO of the respective VM to trigger a VM exit event when the value of CR3 is written, placing a hook on an OS function performing a part of the context change, or changing memory access permissions to trigger a permission violation when the respective function is executed. Once such a mechanism is configured, CSM 60 will be notified that the monitored guest VM is attempting a context switch. In a step 386, CSM 60 may instruct processor 12 to launch the monitored guest VM.

A step 388 waits for the occurrence of a trigger event within the monitored VM. When such an event occurs, a step 390 may identify the currently executing guest process (e.g., according to the current value of the CR3 register of the respective VM). A step 392 determines whether the current notification was triggered by a context switch. When yes, in a step 394, CSM 60 may identify the guest process executing in response to the context switch, and retrieve the trigger event list associated to the respective process from heuristics manager 63. A step 396 then sets values of register 33 according to the trigger event list, to enable monitoring of the trigger events selected specifically for the respective process. CSM 60 may then instruct processor 12 to resume execution of the monitored guest VM.

When the current notification was not caused by a context switch, in a sequence of steps 398-400, heuristics manager 63 may analyze the respective notification to determine whether the respective trigger event warrants changes in the monitoring policy of the currently executing guest process. In one such example, the occurrence of a certain type of trigger event may raise a suspicion of malice, hence heuristics manager 63 may decide to add several other trigger event types to the current list. When manager 63 decides to change the list of trigger events, a step 402 may reset values of trigger selection register 33 to reflect the adding and/or removal of trigger event types selected to trigger notifications for the currently executing guest process.

In an alternative embodiment, instead of actively detecting the context switch and writing context-specific values into register 33 (steps 384, 392, 394, and 396 in FIG. 14, among others), CSM 60 may rely on the operating system, or even directly on the processor, to automatically select the respective values according to the current context. Such embodiments may be substantially more efficient than the one illustrated in FIG. 14, since they avoid generating a costly VM exit event with every context switch occurring within the monitored guest VM.

One category of such embodiments relies on an operating system which, upon performing a context switch, automatically indicates to processor 12 a new set of trigger selection values. Such embodiments may use a plurality of trigger selection bitmaps stored in memory, each such trigger selection bitmap specific to a particular context/guest process. An address of the trigger selection bitmap associated with the current context may be stored in INCR 31 (for instance, trigger map pointer in FIG. 5). Each trigger selection bitmap may be configured by CSM 60, for instance upon detecting the creation of a new memory context (e.g., as part of launching a new process). Then, CSM 60 may communicate the trigger map pointer associated with the respective context to the operating system. The OS may store the trigger map pointer in a data structure used for managing execution within the respective memory context (e.g., the KPROCESS structure used by the Windows® OS). When carrying out a context switch to a new context, the OS may be configured to automatically write the value of the trigger map pointer associated with the new context into INCR 31. Thus, processor 12 will use the respective trigger selection bitmap when performing trigger filtering while executing code in the new memory context. Meanwhile, the trigger selection bitmap may be edited by CSM 60, independently of the OS.

Figure 15:
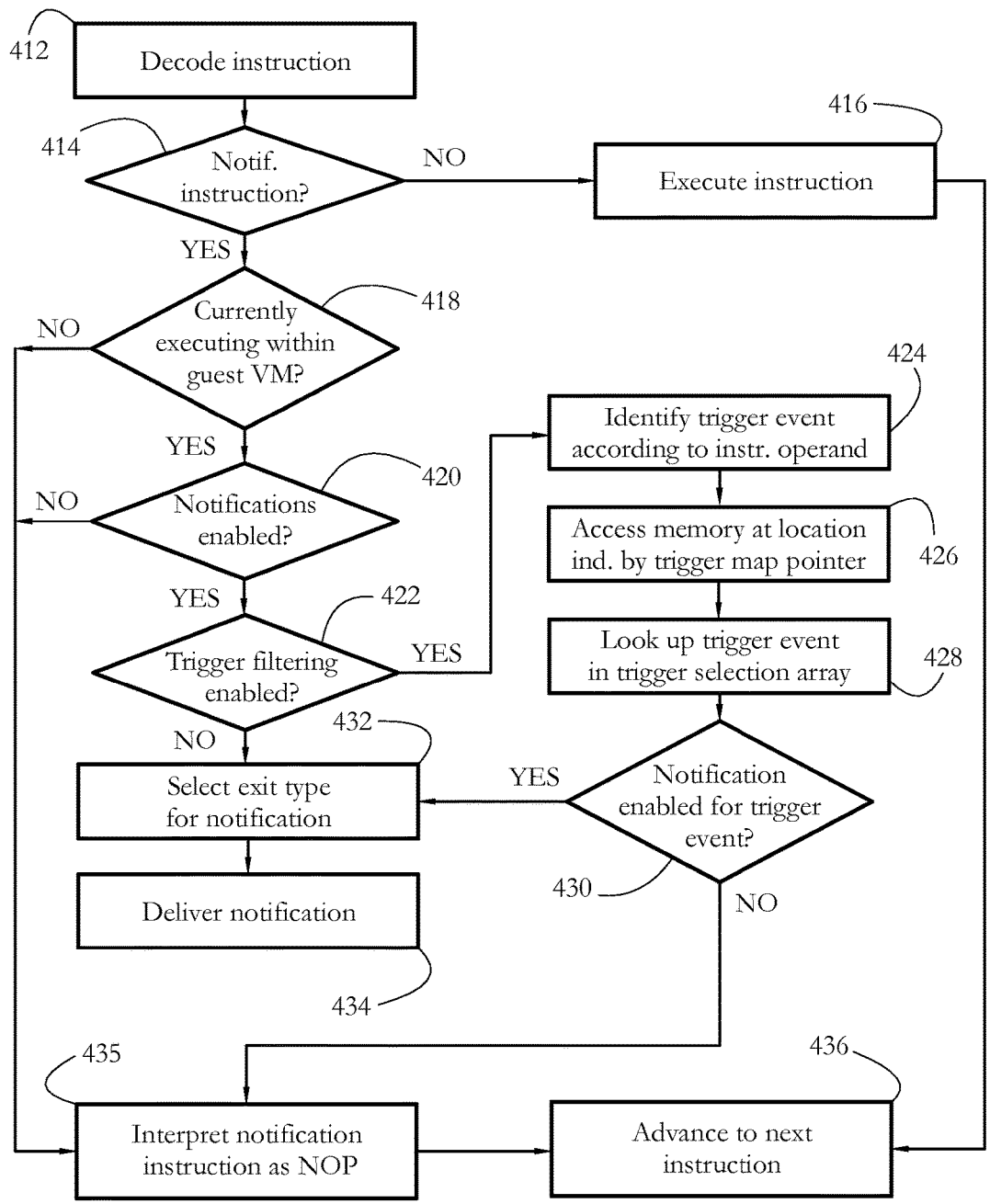
FIG. 15 shows an exemplary sequence of steps performed by the processor to execute an instruction, in an embodiment of the present invention having a context-specific introspection notification register.

Another category of embodiments enabling efficient context-specific introspection notifications relies on a processor that atomically updates register 37 along with the CR3 register, so that when the guest VM switches from a first to a second context, fields of context-specific INCR 37 are automatically populated with values corresponding to the second context. For instance, the trigger map pointer must automatically point to the trigger event map used to generate introspection notifications in the second context. FIG. 15 illustrates an exemplary sequence of steps performed by processor 12 to process an instruction, in an embodiment that uses context-specific INCR 37 and a memory-stored trigger event bitmap. In contrast to the embodiment described above in relation to FIG. 9, a sequence of steps 426-428 looks up the current trigger event in memory, at the address indicated by the trigger map pointer of context-specific INCR 37 (see e.g., FIG. 8). Also, a sequence of steps 420-422 may read fields of context-specific INCR 37 instead of "global" INCR 31 as in steps 310-312 of FIG. 9.

Figure 16:
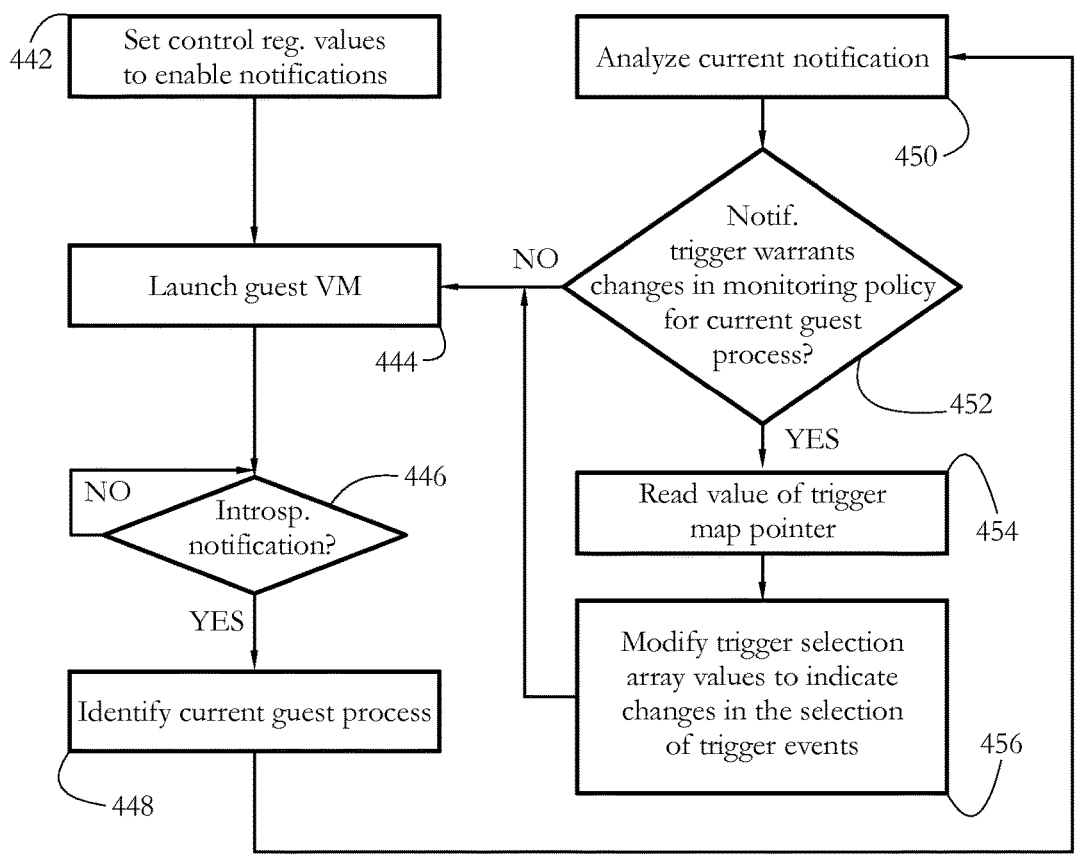
FIG. 16 illustrates another exemplary sequence of steps performed by the computer security module to carry out context-specific monitoring according to some embodiments.

FIG. 16 shows an exemplary sequence of steps performed by CSM 60 to carry out monitoring of the guest VM in an embodiment wherein processor 12 operates according to FIG. 15. In contrast to the embodiment illustrated in FIG. 14, the embodiment of CSM 60 shown in FIG. 16 no longer detects context switches via VM exit events, which may result in a substantial overhead reduction. Moreover, a sequence of steps 454-456 updates values of the trigger event bitmap/array in memory, at the location indicated by the trigger map pointer.

The exemplary systems and methods described above allow performing computer security operations in a host system which employs hardware virtualization. In some embodiments, a computer security module protects a set of guest virtual machines from computer security threats. The computer security module may execute outside the protected VMs (for instance, at the level of a hypervisor) or inside the protected VM. In some embodiments, the computer security module receives introspection notifications from the protected VM, each such notification indicating that a particular trigger event has occurred during execution of software within the respective VM. Exemplary trigger events may include, among others, a system call. In some embodiments, delivering a notification comprises suspending execution of guest software and switching the processor to executing a notification handler forming part of the computer security module. Having received a notification about the occurrence of the respective event, the computer security module may determine whether the event is indicative of a computer security threat, and when yes, may take protective action against the respective guest software or guest VM. After analyzing each notification, the computer security module may instruct the processor to resume execution of the protected guest VM.

Some embodiments of the present invention modify the existing instruction set architecture (ISA) of the processor to introduce a dedicated instruction for delivering introspection notifications. The instruction may be encoded such that it is interpreted as a no-operation instruction (NOP) by legacy processors and/or by processors that do not support hardware virtualization or do not currently execute in hardware virtualization mode. The introspection notification instruction may comprise an operand, the value of the operand uniquely identifying a type of trigger event, the occurrence of which is being notified by the respective instruction. In such embodiments, each trigger event type may receive a unique label (e.g., even number). The operand may be implicit or explicit in the syntax of the introspection notification instruction. When the operand is implicit, it may be read from a processor register such as EAX, RCX, or a dedicated model-specific register (MSR). To use implicit operands, software executing within the protected VM may place the appropriate event number in the pre-determined register (e.g., EAX) before issuing the introspection notification instruction.

Taking full advantage of the introspection notification instruction may require that software producers, for instance OS developers, modify existing code by inserting the introspection notification instruction at various points within the code. In an exemplary deployment scenario, each OS developer may assemble a list of trigger event types (e.g., system calls, process creation or termination, file creation or access, etc.), the occurrence of which will introspection notifications to computer security software. Some embodiments of the present invention allow defining a virtually unlimited number of trigger events types. Each such trigger event type may be assigned a unique trigger ID (e.g., a type-specific number), wherein such trigger IDs may differ between various OS manufacturers or between various versions of the same OS. Then, the OS code may be modified by inserting an introspection notification instruction wherever the respective code performs an operation which amounts to a monitored type of trigger event, while ensuring that the trigger ID corresponding to the respective type of event is passed as an operand of the notification instruction.

The OS manufacturer and other software developers may choose to deliver multiple versions/builds of certain libraries, wherein one version may include notifications for a reduced set of trigger event types, while another version may include notifications for an extended set (e.g., thousands) of trigger event types. A system administrator or a user of the security software may then decide which version to use according to hardware specifications, security requirements, and/or capabilities of the security software. For known and trusted processes, the security software might instruct the OS to load binaries which include notifications for the reduced set of trigger event types. In contrast, for unknown processes, the security software might require the loading of binaries provided with notifications for the extended set of trigger event types.

Detecting the occurrence of certain events during software execution has been a long standing preoccupation of the computer security community. In conventional systems, such events are intercepted via a category of methods generically known as hooking, or by filtering capabilities built into the OS (e.g. file system minifilters and WFP network filters in Windows®). Hooking may comprise modifying an existing OS function by adding a piece of code, which redirects execution of the respective function to the security software. Thus, security software is notified that an attempt has been made to execute the respective function. Such hooking may create performance and stability problems, and may be de-activated or otherwise rendered ineffective by malicious software.

Another conventional event interception method comprises identifying a section of memory where a particular OS function is stored, and changing memory access permissions to the respective memory section to generate an access violation when an attempt is made to access the respective memory section. The violation is typically forwarded for handling to the security software. One problem with such methods is that memory access permissions are typically set with a hardware-enforced granularity (e.g., one memory page of 4 kB). When the targeted function resides in the same page as other software objects, changing access permissions to the page may result in many violations caused by software attempting to access objects other than the target function. This may create a substantial overhead and therefore affect the performance of the protected system.

In contrast to traditional hooking and filtering methods, some embodiments of the present invention allow unified, selective and efficient manner of notifying security software about the occurrence of a broad variety of events during execution of guest software. Some embodiments do not require placing code hooks or changing memory access permissions, but rely instead on a dedicated processor instruction, which may be used by legitimate software (e.g. the operating system) to deliver introspection notifications. Developing and maintaining conventional event filtering capabilities, such as the Windows® minifilters, requires a substantial effort on the part of software developers. In contrast, a comparable functionality may be obtained with substantially lower code complexity and cost, by implementing some embodiments of the present invention.

In addition to the introspection notification instruction, some embodiments also introduce a set of control registers within the processor, the respective registers configured to store parameters that control the manner in which the processor processes an introspection notification instruction. In some embodiments, a notification activation field allows software such as the security module or a hypervisor executing on the respective host system, to turn the introspection notification functionality on or off.

Another control field of the introspection notification register may indicate whether notifications should be delivered outside the monitored virtual machine (e.g. via a VM exit event), or to a handler executing within the respective VM (e.g., via a #VE exception on Intel® platforms). The use of in-VM handlers (such as minivisors on AMD® platforms) may be preferable because such configurations avoid the relatively large computational expense of a VM exit event. However, such configurations may be less secure, since the in-VM handler may be more vulnerable to malicious software executing within the respective VM.

Another field of the control register of the processor may enable or disable event filtering. In some embodiments, event filtering allows computer security software to select a subset of trigger events for which to receive notifications. An additional event selection register of the processor may be used to indicated a current selection of trigger events. The register may have a distinct field (e.g., a bit) for each distinct type of trigger event; an ON value of the respective field may indicate that the respective event will trigger an introspection notification, while an OFF value may indicate that the respective event is currently not selected to trigger notifications. In some embodiments, when the processor encounters an introspection notification instruction, it may identify the event being notified (for instance according to an operand of the introspection notification instruction), and may lookup the respective event type in the event selection register. The processor may then decide not to deliver the respective notification when the current values of the event selection register indicates that the respective type of trigger event is not currently selected to trigger notifications. In some embodiments, a trigger event bitmap indicating trigger events currently selected for notification is stored in memory, instead of on a processor register. In one such example, the trigger event bitmap is part of a VM state object (e.g., VMCS on Intel® platforms, VMCB on AMD® systems). In another example, a pointer to the event selection bitmap is stored within the introspection notification control register.

By reducing the count of events that trigger notifications, event filtering may substantially reduce the overhead of security monitoring. Also, event filtering gives security software substantial flexibility on the choice of trigger events. Such flexibility may be useful in the constantly-changing world of computer security threats. In some embodiments, the computer security module may select trigger events according to a set of security heuristics; such heuristics may change to accommodate newly discovered security threats. Some embodiments may allow security software to adapt to new threats by being able to change the selection of monitored trigger events.

Some embodiments allow the described introspection notification mechanism to be context-specific. In one such example, the processor register indicating the current context (e.g., CR3 on x86 platforms) is architecturally and/or functionally connected to the introspection notification control register, so that every change of context is accompanied atomically by an update of the introspection notification control register. In some embodiments, the atomic update of the two registers is made possible by a dedicated dual register update processor instruction. In an exemplary use scenario, the operating system may maintain a pointer to an event selection array (e.g. bitmap) allocated individually for each memory context. When performing a context switch, OS software may employ the dual register update instruction to atomically change the values of the CR3 and of the trigger map pointer.

Such context-specific introspection notifications may enable even more flexibility for computer security software. The described introspection notification mechanism may be used in conjunction with a reputation database such as a whitelist, so that each software object (e.g., process) may be monitored for the occurrence of a distinct set of trigger events. Processes having a good reputation, i.e., having a low likelihood of malice, may thus be monitored using a reduced set of trigger events, while unknown processes and processes displaying malware-indicative behavior may be monitored using a full set of trigger events. In some embodiments, the reputation associated to each process may vary in time. For instance, a newly created process may be monitored using a large set of trigger events in the early stages of execution. When the process seems to be well behaved, the number of monitored trigger events may be progressively reduced. If the process suddenly exhibits malware-indicative behavior, the number of monitored trigger events may be increased again, ensuring a prompt and secure response.

Some embodiments of the present invention may be adapted and applied to delivering event notifications at the OS level, irrespective of whether the host computer system operates a hardware virtualization platform or not. In one such example, instead of delivering a VM exit or a virtualization exception as part of an introspection notification, the processor may be configured to deliver another kind of exception that may be handled at kernel level. This may allow translating the mechanisms and methods described herein to delivering notifications for instance from user mode to kernel mode. Therefore, some embodiments may improve and extend existing mechanisms for filtering and analyzing system calls and similar OS functionality.

The scope of some embodiments of the present invention can be easily extended to applications beyond the sphere of computer security. Some structural and functional aspects of the present invention can be used, for instance, to perform efficient software profiling and/or debugging. The aspects described herein may also be used to introduce new functionality to existing OS services and components such as file system drivers and network drivers, wherein the respective functionality is not inherently related to computer security.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising:
a hardware processor, and
a memory,
wherein the hardware processor is configured to perform memory address translations according to a content of a context-indicative register of the hardware processor and to deliver introspection notifications according to a content of a notification control register of the hardware processor, wherein the hardware processor is further configured to:
in response to receiving from the memory a dual register update instruction instructing the hardware processor to write a first value to the context-indicative register and to write a second value to the notification control register, write the first value and the second value;
in response to receiving from the memory an introspection notification instruction, determine according to a content of the notification control register whether a delivery condition is satisfied, wherein the introspection notification instruction forms part of a guest process executing within a virtual machine exposed on the host system, and wherein execution of the guest process would cause an occurrence of a trigger event within the virtual machine;
in response to determining whether the delivery condition is satisfied, when the delivery condition is satisfied, deliver the introspection notification; and
in response to determining whether the delivery condition is satisfied, when the delivery condition is not satisfied, continue execution of the guest process without delivering the introspection notification,
wherein delivering the introspection notification comprises suspending execution of the guest process and in response, switching to executing a computer security program distinct from the guest process, the computer security program configured to determine whether the occurrence of the trigger event is indicative of a computer security threat.

2. The host system of claim 1, wherein the trigger event comprises a system call.

3. The host system of claim 1, wherein the dual register update instruction includes an operation field and an operand field, and wherein the hardware processor is configured to determine the second value according to a content of the operand field.

4. The host system of claim 1, wherein the notification control register comprises an activation field indicating whether introspection notifications are enabled, and wherein the hardware processor is configured to determine whether the delivery condition is satisfied according to a content of the activation field.

5. The host system of claim 1, wherein the hardware processor further comprises a trigger identification register and is configured, in response to receiving the introspection notification instruction, to determine an event type of the trigger event according to a content of the trigger identification register.

6. The host system of claim 1, wherein the second value is indicative of a memory address, and wherein the hardware processor is configured to determine whether the delivery condition is satisfied according to a content of a section of the memory, the section located at the memory address.

7. The host system of claim 6, wherein the section stores an activation indicator indicating whether introspection notifications are currently enabled, and wherein determining whether the delivery condition is satisfied comprises:
determining according to the activation indicator whether introspection notifications are currently enabled, and
in response, when introspection notifications are currently enabled, determine that the delivery condition is satisfied.

8. The host system of claim 6, wherein the section stores a trigger selection data structure comprising a plurality of fields, each field of the plurality of fields indicating whether introspection notifications are currently enabled for a selected type of event corresponding to the each field, and wherein the hardware processor is further configured to:
determine an event type of the trigger event,
look up the event type in the trigger selection data structure, to determine whether introspection notifications are enabled for the event type,
in response to determining whether introspection notifications are enabled for the event type, when introspection notifications are enabled for the event type, determine that the delivery condition is satisfied, and
in response to determining whether introspection notifications are enabled for the event type, when introspection notifications are not enabled for the event type, determine that the delivery condition is not satisfied.

9. The host system of claim 8, wherein the section further stores an overrun control indicator indicating whether notifications of out-of-range events are enabled, and wherein the hardware processor is further configured, in response to looking up the event type in the trigger selection data structure, when the trigger selection data structure contains no field that corresponds to the event type, to:
determine according to a content of the overrun control field whether notifications of out-of-range events are enabled, and
in response, when notifications of out-of-range events are enabled, determine that the delivery condition is satisfied.

10. The host system of claim 1, wherein determining whether the delivery condition is satisfied comprises:
determining whether the introspection notification instruction executes within the virtual machine, and in response, when the introspection notification instruction does not execute within the virtual machine, determining that the delivery condition is not satisfied.

11. The host system of claim 1, wherein the hardware processor is configured, when the delivery condition is not satisfied, to interpret the introspection notification instruction as a no-operation instruction (NOP).

12. The host system of claim 1, wherein the computer security program executes outside the virtual machine.

13. The host system of claim 1, wherein the computer security program executes within the virtual machine.

14. A non-transitory computer-readable medium storing instructions which, when executed by a hardware processor of a host system, causes the host system to form a computer security program, wherein:
the hardware processor is configured to:
perform memory address translations according to a content of a context-indicative register of the hardware processor, and deliver introspection notifications according to a content of a notification control register of the hardware processor;
in response to receiving from a memory of the host system a dual register update instruction instructing the hardware processor to write a first value to the context-indicative register and to write a second value to the notification control register, write the first value and the second value;
in response to receiving an introspection notification instruction, determine according to a content of the notification control register whether a delivery condition is satisfied, wherein the introspection notification instruction forms a part of a guest process executing within a virtual machine exposed on the host system, and wherein execution of the guest process would cause an occurrence of a trigger event within the virtual machine;
in response to determining whether the delivery condition is satisfied, when the delivery condition is satisfied, deliver the introspection notification; and
in response to determining whether the delivery condition is satisfied, when the delivery condition is not satisfied, continue execution of the guest process without delivering the introspection notification, wherein delivering the introspection notification comprises suspending execution of the guest process and in response, switching to executing the computer security program, wherein the computer security program is distinct from the guest process;
wherein the computer security program is configured to determine whether the occurrence of the trigger event within the virtual machine is indicative of a computer security threat.

15. The non-transitory computer-readable medium of claim 14, wherein the trigger event comprises a system call.

16. The non-transitory computer-readable medium of claim 14, wherein the dual register update instruction includes an operation field and an operand field, and wherein the hardware processor is configured to determine the second value according to a content of the operand field.

17. The non-transitory computer-readable medium of claim 14, wherein the notification control register comprises an activation field indicating whether introspection notifications are enabled, and wherein the hardware processor is configured to determine whether the delivery condition is satisfied according to a content of the activation field.

18. The non-transitory computer-readable medium of claim 14, wherein the second value is indicative of a memory address, and wherein the hardware processor is configured to determine whether the delivery condition is satisfied according to a content of a section of the memory, the section located at the memory address.

19. The non-transitory computer-readable medium of claim 18, wherein the computer security program is further configured to:
determine the memory address according to the guest process; and
write a set of values to the section, the set of values determined according to the guest process.

20. The non-transitory computer-readable medium of claim 19, wherein the set of values is determined according to a likelihood that the guest process is malicious.

21. The non-transitory computer-readable medium of claim 19, wherein the computer security program is configured to write the set of values in response to determining that the trigger event has occurred.

22. The non-transitory computer-readable medium of claim 18, wherein the section stores an activation indicator indicating whether introspection notifications are currently enabled, and wherein determining whether the delivery condition is satisfied comprises:
determining according to the activation indicator whether introspection notifications are currently enabled, and
in response, when introspection notifications are currently enabled, determine that the delivery condition is satisfied.

23. The non-transitory computer-readable medium of claim 18, wherein the section stores a trigger selection data structure comprising a plurality of fields, each field of the plurality of fields indicating whether introspection notifications are currently enabled for a type of trigger event corresponding to the each field, and wherein the hardware processor is further configured to:
determine an event type of the trigger event,
look up the event type in the trigger selection data structure, to determine whether introspection notifications are enabled for the event type,
in response to determining whether introspection notifications are enabled for the event type, when introspection notifications are enabled for the event type, determine that the delivery condition is satisfied, and
in response to determining whether introspection notifications are enabled for the event type, when introspection notifications are not enabled for the event type, determine that the delivery condition is not satisfied.

24. The non-transitory computer-readable medium of claim 23, wherein the computer security program is configured to:
select a target event type according to the guest process, and
write a third value to a target field of the plurality of fields, the target field corresponding to target event type.

25. The non-transitory computer-readable medium of claim 18, wherein the section further stores an overrun control indicator indicating whether notifications of out-of-range events are enabled, and wherein the hardware processor is further configured, in response to looking up the event type in the trigger selection data structure, when the trigger selection data structure contains no field that corresponds to the event type, to:
determine according to a content of the overrun control field whether notifications of out-of-range events are enabled, and in response, when notifications of out-of-range events are enabled, determine that the delivery condition is satisfied.

26. The non-transitory computer-readable medium of claim 14, wherein the computer security program is further configured to:
   detect a context switch occurring within the virtual machine, the context switch comprising the hardware processor switching from executing the guest process to executing a second process within the virtual machine, and
   in response to detecting the context switch, write the second value to the notification control register of the hardware processor.

27. The non-transitory computer-readable medium of claim 14, wherein the computer security program is further configured to:
   detect a creation of the guest process by an operating system executing within the virtual machine;
   in response to detecting the creation of the guest process, determine the second value; and
   write the second value to a process management data structure used by the operating system to manage execution of the guest process.

28. The non-transitory computer-readable medium of claim 14, wherein determining whether the delivery condition is satisfied comprises:
   determining whether the introspection notification instruction executes within the virtual machine, and
   in response, when the introspection notification instruction does not execute within the virtual machine, determining that the delivery condition is not satisfied.

29. The non-transitory computer-readable medium of claim 14, wherein the hardware processor is configured, when the delivery condition is not satisfied, to interpret the introspection notification instruction as a no-operation instruction (NOP).

30. The non-transitory computer-readable medium of claim 14, wherein the computer security program is further configured, in response to the hardware processor delivering the notification, to determine that the trigger event has occurred.

31. The non-transitory computer-readable medium of claim 14, wherein the computer security program is further configured, in response to the hardware processor delivering the notification, to determine the event type according to a content of a trigger identification register of the hardware processor.

32. The non-transitory computer-readable medium of claim 14, wherein the computer security program is further configured, in response to the hardware processor delivering the notification, to determine the event type according to a content of a virtual machine state object (VMSO) stored in the memory, the VMSO used by the hardware processor to represent a state of the virtual machine.

33. The non-transitory computer-readable medium of claim 14 wherein the computer security program executes outside the virtual machine.

34. The non-transitory computer-readable medium of claim 14, wherein the computer security program executes within the virtual machine.

35. A method of protecting a host system from computer security threats, the host system comprising a hardware processor and a memory, the method comprising:
   employing the hardware processor, in response to receiving an introspection notification instruction, to determine according to a content of a notification control register of the hardware processor whether a delivery condition is satisfied, wherein the introspection notification instruction forms a part of a guest process executing within a virtual machine exposed on the host system, and wherein execution of the guest process would cause an occurrence of a trigger event;
   in response to determining whether the delivery condition is satisfied, when the delivery condition is satisfied, employing the hardware processor to deliver the introspection notification; and
   in response to determining whether the delivery condition is satisfied, when the delivery condition is not satisfied, employing the hardware processor to continue execution of the guest process without delivering the introspection notification, wherein delivering the introspection notification comprises employing the hardware processor to suspend execution of the guest process and in response, to switch to executing a computer security program distinct from the guest process, the computer security program configured to determine whether the occurrence of the trigger event is indicative of a computer security threat,
   wherein the hardware processor is configured to:
      perform memory address translations according to a content of a context-indicative register of the hardware processor and deliver introspection notifications according to a content of the notification control register; and
      in response to receiving a dual register update instruction instructing the hardware processor to write a first value to the context-indicative register and to write a second value to the notification control register, write the first value and the second value.

* * * * *